US009650536B2

(12) United States Patent
Ronne et al.

(10) Patent No.: US 9,650,536 B2
(45) Date of Patent: May 16, 2017

(54) METHOD FOR PRODUCING A NANOCOMPOSITE DISPERSION COMPRISING COMPOSITE PARTICLES OF INORGANIC NANOPARTICLES AND ORGANIC POLYMERS

(71) Applicants: Akzo Nobel Coatings International B.V., Arnhem (NL); BYK-Chemie GmbH, Wesel (DE); Energenics Europe Ltd, Oxfordshire (GB); Universidad del Pais Vasco, Leioa, Bizkaia (ES); YKI, Ytkemiska Institutet AB, Stockholm (SE)

(72) Inventors: Nils Erik Ronne, Uppsala (SE); Melanie Hormann, Wesel (DE); Janin Tecklenburg, Oberhausen (DE); Carsten Nagel, Dülmen (DE); Ulrich Nolte, Kleve (DE); Michael Berkei, Haltern am See (DE); Yingqian Xu, Oxfordshire (GB); Jose Ramon Leiza, Hernani (ES); Yuri Reyes, Donostia-San Sebastián (ES); Maria Paulis, Donostia-San Sebastián (ES); Miren Aguirre Arrese, Elgoibar (ES); Anwar Ahniyaz, Danderyd (SE); Andrea Fornara, Stockholm (SE); Ninja Hanitzsch, Oberhausen (DE)

(73) Assignees: Akzo Nobel Coatings International B.V., Arnhem (NL); BYK-Chemie GmbH, Wesel (DE); Energenics Europe Ltd., Oxfordshire (GB); Universidad del Paris Vasco, Bizkaia (ES); YKI, Ytkemiska Institutet AB, Stockholm (SE)

( * ) Notice: Subject to any disclaimer, the term of this patent is extended or adjusted under 35 U.S.C. 154(b) by 163 days.

(21) Appl. No.: 14/413,166

(22) PCT Filed: May 15, 2013

(86) PCT No.: PCT/EP2013/060095
§ 371 (c)(1),
(2) Date: Jan. 6, 2015

(87) PCT Pub. No.: WO2014/005753
PCT Pub. Date: Jan. 9, 2014

(65) Prior Publication Data
US 2015/0197660 A1    Jul. 16, 2015

(30) Foreign Application Priority Data
Jul. 6, 2012 (EP) .................................. 12005049
Jul. 9, 2012 (EP) .................................. 12005065

(51) Int. Cl.
| | |
|---|---|
| C08F 2/22 | (2006.01) |
| C09D 133/12 | (2006.01) |
| C08J 3/05 | (2006.01) |
| C08J 3/09 | (2006.01) |
| C08J 3/11 | (2006.01) |
| C08F 2/44 | (2006.01) |
| C08J 5/00 | (2006.01) |
| C09D 133/06 | (2006.01) |
| B82Y 30/00 | (2011.01) |
| C09D 129/04 | (2006.01) |
| C09D 131/04 | (2006.01) |
| C08F 2/24 | (2006.01) |

(52) U.S. Cl.
CPC ............ *C09D 133/12* (2013.01); *B82Y 30/00* (2013.01); *C08F 2/22* (2013.01); *C08F 2/44* (2013.01); *C08J 3/05* (2013.01); *C08J 3/09* (2013.01); *C08J 3/092* (2013.01); *C08J 3/11* (2013.01); *C08J 5/005* (2013.01); *C09D 129/04* (2013.01); *C09D 131/04* (2013.01); *C09D 133/06* (2013.01); *C08F 2/24* (2013.01)

(58) Field of Classification Search
None
See application file for complete search history.

(56) References Cited

PUBLICATIONS

Costoyas, A., et al. "Encapsulation of Silica Nanoparticles by Miniemulsion Polymerization" J. Polym. Sci. Part A: Polym. Chem. 2009, 47, 935-948.*
Tang, E. et al., "Fabrication of zinc oxide/poly(styrene) grafted nanocomposite latex and its dispersion". European Polymer Journal 2007, 43, 4210-4218.*
Mishra, S. et al., "Novel synthesis of nano-calcium carbonate (CaC03)/polystyrene (PS) core-shell nanoparticles by atomized microemulsion technique and its effect on properties of polypropylene (PP) composites". Polymers for Advanced Technologies 2011, 22(12), 2571-2582.*

* cited by examiner

*Primary Examiner* — Richard A Huhn
(74) *Attorney, Agent, or Firm* — Edward E. Sowers; Brannon Sowers & Cracraft PC

(57) ABSTRACT

The present invention relates to a method for producing nanocomposite dispersions comprising composite particles of inorganic nanoparticles and organic polymers in a continuous phase, especially in a dispersion medium, as well as to the nanocomposite dispersions thus obtained and to the use thereof.

20 Claims, No Drawings

METHOD FOR PRODUCING A NANOCOMPOSITE DISPERSION COMPRISING COMPOSITE PARTICLES OF INORGANIC NANOPARTICLES AND ORGANIC POLYMERS

CROSS-REFERENCES TO RELATED APPLICATIONS

This application is a National Stage filing of International Application PCT/EP 2013/060095, filed May 15, 2013, claiming priority to EP 12 005 049.7 filed Jul. 6, 2012, and, EP 12 005 065.3 filed Jul. 9, 2012, entitled "METHOD FOR PRODUCING A NANOCOMPOSITE DISPERSION COMPRISING COMPOSITE PARTICLES OF INORGANIC NANOPARTICLES AND ORGANIC POLYMERS." The subject application claims priority to PCT/EP 2013/060095, to EP 12 005 049.7, and to EP 12 005 065.3 and incorporates all by reference herein, in their entirety.

BACKGROUND OF THE INVENTION

The present invention relates to the technical field of organic-inorganic composite or hybrid materials, especially to the incorporation of inorganic nanoparticles (such as e.g. metal oxide nanoparticles) in organic polymers (such as e.g. latexes).

Especially, the present invention relates to a method for producing a nanocomposite dispersion comprising composite particles of inorganic nanoparticles and organic polymers in a continuous phase, especially in a dispersion medium, and to the nanocomposite dispersion thus obtained as well as to composite particles of inorganic nanoparticles and organic polymers obtainable from this nanocomposite dispersions.

Furthermore, the present invention refers to the use of the nanocomposite dispersions of the present invention or of the composite particles of the present invention, respectively, in plastics and polymeric compositions, in coatings, in paints, in lacquers and adhesives, especially in applications for wood-based materials or substrates.

Further, the present invention refers to plastics and polymeric compositions, coatings, paints, lacquers and adhesives, which comprise the nanocomposite dispersions of the present invention or the composite particles of the present invention, respectively, especially in applications for wood-based materials or substrates.

Finally, the present invention refers also to additive compositions, especially for use in plastics and polymeric compositions, coatings, paints, lacquers and adhesives, which additive compositions comprise nanocomposite dispersions of the present invention or composite particles of the present invention, respectively.

Incorporation of inorganic nanoparticles, especially metal oxide nanoparticles, in polymer matrices or polymer particles has become of particular interest due to the wide range of applications of the resulting composite or hybrid materials, such as e.g. in coatings, adhesives, medicine, cosmetics etc., for instance, also in the field of wood-based materials. With the incorporation of inorganic nanoparticles into polymeric matrices, improved properties of the composite or hybrid materials may result.

Wood-based materials find a broad range of applications, especially in civil engineering, e.g. as construction material, in furniture industry and the like.

The term "wood-based materials" as used herein denotes, beside solid wood, also wooden materials such as fiber-, chip-, and particleboard materials. The wood-based material can be any type and form of wood based material such as chips, fibers, sheets, laminas, veneers, pieces etc. The wood-based materials or products may, for instance, be a laminated or veneered material. The wood-based materials or products may, for instance, also be a composite product such as e.g. a particle board, fiber board (such as MDF), chip board or oriented strand board. The wood-based materials or products may, for instance, be a laminated or veneered material, such as laminated flooring, veneered flooring, a veneered furniture material, plywood, a wall panel, a roofing panel, a laminated beam, or a composite product.

Wood has an intrinsic potential to fulfill the criteria for being a competitive and sustainable engineering material, i.e. it is a renewable resource available in vast quantities and formed as a natural composite with an extraordinary high strength-to-weight ratio. For outdoor use it is, however, necessary to enhance the performance and long-term durability of wood-based materials.

Especially, wood is an excellent building material with a high strength/density ratio, it is a renewable resource and has been used successfully for centuries. When wood is used as a building material, it is also desirable to expose the beautiful surface structure of the wood material, thus clear coatings is the ideal choice of surface treatment for wood products. However, protection of lignin and other carbohydrates during weathering of wood is one of the main challenges in outdoor applications of clear coatings on various wood products.

One particular problematic area and drawback for the use of wood as an engineering material outdoor is its high sensitivity for UV degradation. It is common knowledge that wood is affected by light, both by color changes and by degradation of the surface. Particularly, during outdoor exposure, the effects are rapidly noticeable on untreated wood, which becomes grey and more loosely bound raised fibers become visible at the surface. This is mainly because the surface lignin (which represents ca. 30% of the wood weight) is degraded into smaller molecular fragments that can be washed out by rain.

Traditionally, UV protection of wood has been performed through hiding the sensitive lignin under pigments, through applying a tinted wood coating, which efficiently hinders the UV light to reach the lignin. To date, this method has been widely accepted in the Scandinavian and North American countries, but is not fully accepted in other countries, e.g. in southern Europe and Japan.

Moreover, a recent trend within architecture is to include clear-coated wood as a significant part of the exterior design, thereby taking advantage of the appealing aesthetic properties of the wood material.

Furthermore, it is also important to develop new improved clear coating systems from a legal point of view. In some European countries, for example in Germany, there is a need for a warranty from the coating companies that the coating will last for a certain period. With improved clear coatings it would be easier for the coating companies to give these warranties.

To protect wood products effectively during weathering, the high energetic portion of the sunlight spectrum, i.e. UV-VIS (250 to 440 nm), should be cut off or filtered before it reaches the wood surface. Due to tighter regulations and environmental concerns in the coating sectors, water-borne clear coatings are more appreciated compared to the solvent-based ones.

Traditionally, organic UV absorbers are used in clear coatings for wood applications, however, these substances degrade rapidly upon outdoor weathering. As a result of this, the coating not only loses its intended UV-protection function very quickly, it also contributes to volatile organic compounds (VOCs) emission to the environment. Current clear coating systems with organic UV absorbers need to be replaced or repainted after approximately 2 years.

Thus, if superior UV-absorbing systems could be identified for water-based clear coatings, the service-life of the wood could be extended and the environmental impact and the cost for maintenance and for wood replacement would be decreased.

Although several inorganic fillers, such as $TiO_2$, ZnO, $Fe_2O_3$ and $CeO_2$, have been extensively studied as potential candidates in various clear coating formulations, little progress has been made so far, due to the difficulty of accessing transparent inorganic fillers that are compatible with water-based clear coating formulations. Therefore, in wood coating industry, there is an urgent need to improve transparency, color stability and durability of transparent wood coatings for outdoor applications.

Functional nanoparticles can also be introduced into water-based wood adhesives in order to improve the properties of wood-adhesive joints. The most commonly used adhesives in wood applications are the thermoset formaldehyde-based adhesives (urea-formaldehyde UF, melamine-formaldehyde MF, phenyl-formaldehyde PF, resorcinol-formaldehyde RF). However, due to formaldehyde emission problems, these adhesives should be phased out in the future.

Other alternatives are thermoplastic adhesives from petroleum sources or biobased adhesives. For example, water-based polyvinyl acetate adhesives are used for gluing of wood. This adhesive has some limitations due to the thermoplastic character. It is sensitive to both moisture and heat and tend to creep under load. This limits its application to non-structural uses only, and it is not used at elevated temperatures.

However, if the mechanical properties of polyvinyl acetate or of biobased thermoplastic adhesives could be improved, these adhesives could be used for a wider range of wood applications in the future.

For example, if the creep were reduced for these new adhesives, they might replace some formaldehyde-based adhesives in load bearing applications.

Incorporation of nanoparticles in water-based adhesives can also increase the cohesive strength of the adhesive without decreasing the adhesive properties of the adhesive. However, it is crucial that the nanoparticles are well dispersed in the polymer matrix and that the nanoparticles are compatible with the adhesive polymer. However, with conventional systems, only low compatibilities between the polymer matrix, on the one hand, and the nanoparticles, on the other hand, could be reached so far, resulting in non-homogeneous systems or in systems with low durability or life-time. In addition, the price of the nanoparticles used in this application so far is too high.

In the state of the art, several approaches have been made in order to increase the compatibility of such nanoparticles; however, so far these results are not very sufficient (see e.g. US 2002/0055581 A1, US 2002/0086908 A1, EP 1 471 108 A1 etc.).

BRIEF SUMMARY OF THE INVENTION

Therefore, it is an object of the present invention, to provide a method for producing polymeric binder compositions comprising inorganic nanoparticles, especially a method for providing nanocomposite dispersions comprising composite particles comprising inorganic nanoparticles and organic polymers in a continuous phase, wherein the aforementioned disadvantages and/or drawbacks of the prior art systems should be at least partially avoided or even at least essentially overcome.

Especially, it is another object of the present invention to develop new dispersion systems, which are especially appropriate for wood applications and show improved properties, especially improved UV-absorbing properties and/or improved mechanical properties and/or improved barrier properties (e.g. against water, oxygen, vapor etc.).

Furthermore, it is another object of the present invention to provide non-formaldehyde containing dispersion systems, which are especially appropriate for wood applications.

Finally, it is a further object of the present invention to provide nanocomposite dispersions having improved light-absorbing properties and/or improved mechanical properties and/or improved barrier properties (e.g. with respect to oxygen, water, vapor, gases etc.) when used in wood applications, e.g. in coatings, paints, lacquers, adhesives etc.

To achieve the aforementioned objects, the present invention proposes, according to a first aspect of the present invention, a method for producing a nanocomposite dispersion comprising composite particles of inorganic nanoparticles and organic polymers in a continuous phase, especially in a dispersion medium, according to the teaching herein.

According to a further aspect of the present invention, the present invention further provides a nanocomposite dispersion comprising composite particles of inorganic nanoparticles and organic polymers in a continuous phase, especially in a dispersion medium, as disclosed herein.

Also, the present invention refers to composite particles of inorganic nanoparticles and organic polymers, as disclosed herein.

Further, the present invention also relates to the use of the nanocomposite dispersion of the present invention or the composite particles of the present invention, respectively, as disclosed herein.

In addition, the present invention refers to plastics and polymeric compositions, coatings, paints, lacquers and adhesives according to the current disclosure.

Finally, the present invention further provides, according to still another aspect of the present invention, an additive composition further disclosed herein.

It will be understood that features, embodiments, advantages and the like which are recited herein in relation to one aspect of the invention, of course, also apply correspondingly in relation to all other aspects of the invention.

Moreover, it is pointed out that the respective values and/or parameter indications can be determined in general on the basis of determination methods which are well-known to the skilled practitioner and/or which are explicitly indicated in the following.

Furthermore, it will be understood that a person skilled in the art may, for a particular application or on an one-off basis, depart from any hereinbelow recited numbers, values and ranges, without thereby leaving the scope of the present invention.

DETAILED DESCRIPTION OF THE INVENTION

The present invention—in accordance with a first aspect of the present invention—refers to a method for producing a nanocomposite dispersion comprising composite particles of inorganic nanoparticles and organic polymers in a continuous phase, especially in a dispersion medium, wherein the method comprises the following method steps:
(a) providing inorganic nanoparticles, especially in the form of a dispersion comprising the inorganic nanoparticles;
(b) then, subjecting the inorganic nanoparticles, especially the dispersion comprising the inorganic nanoparticles, resulting from step (a) to a surface modification, wherein the surface modification comprises an at least two-stage surface treatment comprising: (i) one stage where the inorganic nanoparticles are contacted with at least one dispersing agent and (ii) another stage where the inorganic particles are provided with functional groups on their surfaces, especially via chemical reaction;
(c) subsequently, combining the surface-modified inorganic nanoparticles, especially the dispersion comprising the surface-modified inorganic nanoparticles, resulting from step (b) with at least one kind of polymerizable monomers, followed by a polymerization of the polymerizable monomers in the presence of the surface-modified inorganic nanoparticles, especially via emulsion polymerization, thus resulting in a nanocomposite dispersion comprising composite particles of inorganic nanoparticles and organic polymers in a continuous phase, especially in a dispersion medium.

The method of the present invention as well as the products thus obtained (i.e. nanocomposite dispersions and nanocomposite particles obtainable therefrom) and the uses of the present application are linked to a multitude of advantages and particularities, which will be discussed in the following in a non-limiting manner.

The present invention is based on the surprising finding that homogeneous nanocomposite dispersion with long durability and life-times can be produced if inorganic nanoparticles are subjected to a specific surface-treatment or surface-modification, respectively, as it is envisaged by the present invention, namely by an at least two-stage surface-treatment as described above.

By this specific surface-treatment or surface-modification, respectively, the inorganic nanoparticles are compatibilized, in a particular manner, with respect to the polymerizable monomers and the resulting polymers of the polymerization step (c). In this way, a particularly intimate interaction between surface-modified nanoparticles, on the one hand, and polymerizable monomers and resulting polymers, on the other hand, can be reached, especially by the presence of functional groups on the surface of the inorganic nanoparticles, which functional groups are compatible with the polymerizable monomers and the resulting polymers. Consequently, particularly homogeneous nanocomposite dispersions can be produced, which dispersions contain the composite particles comprising inorganic nanoparticles and organic polymers (i.e. inorganic nanoparticles/organic polymers nanocomposites).

Due to the specific surface-modification or surface-treatment, respectively, of the surfaces of the inorganic nanoparticles these surfaces can interact with the polymerizable monomers and the resulting polymers, so that particularly stable nanocomposite particles comprising these two species (i.e. surface-modified inorganic nanoparticles and organic polymers) can be produced. Therefore, these nanocomposite particles of the present invention are also called, synonymously, "hybrid nanoparticles", "organic-inorganic hybrid nanoparticles" or the like.

Due to the specific polymerization method applied according to the present invention, namely emulsion polymerization, especially polymerization in the miniemulsion state, preferably via an at least two-stage polymerization process as delineated hereinbelow, particularly stable nanocomposite particles can be produced in homogeneous distribution within a continuous phase, especially within a dispersion medium.

By the inventive method, homogeneous nanocomposite dispersions are produced, which can be directly used for the abovementioned purposes (i.e., for instance, for all kinds of wood applications, such as e.g. coatings, lacquers, paints, adhesives etc.) or, alternatively, further processed, e.g. by further concentration of the dispersions (i.e. partial removal of continuous phase, e.g. by drying) or by isolating the nanocomposite particles (i.e. complete removal of continuous phase, e.g. by drying), optionally followed by a step of redispersing etc.

By the inventive method and the products thus obtained, the aforedescribed disadvantages and drawbacks of the prior art methods have been efficiently overcome.

Especially, the nanocomposite dispersions produced according to the present invention provide efficient protection against UV degradation when applied to wood materials.

In this respect, it has to be noted that the nanocomposite dispersions produced according to the present invention lead also to the possibility to provide clear coatings, paints, lacquers etc. made therefrom, thereby taking advantage of the appealing aesthetic properties of the wood material.

Furthermore, the nanocomposite dispersions produced according to the present invention fulfill also the aforedescribed warranty and legal requirements: The coatings therefrom will last for a sufficient period and are also completely free or at least substantially free of undesired or abolished substances, such as VOCs and formaldehydes.

Particularly, the nanocomposite dispersions produced according to the present invention and the nanocomposite particles obtainable therefrom show significantly improved light-protective (e.g. UV-absorbing) properties and also improved mechanical properties and, preferably, also improved barrier properties, especially with respect to liquids (e.g. water) and gases (e.g. oxygen, water vapor etc.).

Consequently, the nanocomposite dispersions produced according to the present invention and the nanocomposite particles obtainable therefrom protect wood products effectively during weathering; especially, the high energetic portion of the sunlight spectrum, i.e. UV-VIS (250 to 440 nm), is efficiently cut off or filtered before it reaches the wood surface.

In addition, the nanocomposite dispersions produced according to the present invention and the nanocomposite particles obtainable therefrom allow also for the production of water-based dispersions (e.g. clear coatings etc.), thus fulfilling the tighter regulations and environmental concerns in the coating sectors.

In contrast to the prior art systems, the systems produced according to the present invention, do not at all degrade upon outdoor weathering. As a result, the systems of the present invention do not lose their intended UV-protection function nor their mechanical function.

Thus, superior UV-absorbing systems, also showing improved mechanical properties, can be produced according to the present invention, especially also on the basis of water-based clear coatings.

Further, the systems produced according to the present invention show also a significant enhancement not only of the mechanical properties but also of the barrier properties when applied as coatings on wood or wood-based substrates.

Furthermore, by the systems produced according to the present invention the service-life of the wood can be significantly extended and the environmental impact and the cost for maintenance and for wood replacement can be efficiently decreased.

According to the present invention, due to the specific surface-treatment of the used inorganic nanoparticles, a multitude of inorganic fillers, such as e.g. $TiO_2$, ZnO, $Fe_2O_3$ and $CeO_2$, can be used to produce, for example, even clear coating formulations having improved light-absorbing and mechanical properties. Due to this specific surface-treatment, there is provided an efficient access to transparent inorganic fillers that are compatible even with water-based clear coating formulations. Therefore, for wood coating industry, significant improvements can be provided with respect to transparency, color stability and durability of transparent wood coatings for outdoor applications.

According to the present invention, functional nanoparticles with specific surface-modification can also be introduced easily into water-based wood adhesives in order to improve the properties of wood-adhesive joints. According to the present invention, efficient adhesive systems can be produced, which are free of undesired substances, such as formaldehydes, VOCs etc. For instance, the present invention also allows for the production, e.g., of polyvinyl acetate based adhesives or biobased thermoplastic adhesives, thus rendering possible a wider range of wood applications.

According to the present invention, the incorporation of the surface-modified inorganic nanoparticles even in water-based adhesives is possible, thus increasing the cohesive strength of the adhesive without decreasing the adhesive properties of the adhesive. This is due to the fact that, according to the present invention, the nanoparticles are well dispersed in the polymer matrix since the nanoparticles are compatible with the adhesive polymer. According to the present invention, high compatibilities between the polymer matrix, on the one hand, and the nanoparticles, on the other hand, are reached, resulting in homogeneous systems or in systems with long durability or life-time, respectively.

Thus, according to the present invention, an efficient and successful approach has been made in order to increase the compatibility of such nanoparticles.

On the whole, the present invention, for the first time, is able to provide an efficient method for producing polymeric binder compositions comprising inorganic nanoparticles, especially an efficient method for providing nanocomposite dispersions comprising composite particles comprising inorganic nanoparticles and organic polymers in a continuous phase, thus at least partially avoiding or even at least essentially overcoming the aforementioned disadvantages and/or drawbacks of the prior art systems.

Especially, the present invention has succeeded in developing new dispersion systems, which are especially appropriate for wood applications and show improved properties, especially improved UV-absorbing properties and/or improved mechanical properties.

Furthermore, the present invention has succeeded in providing, for the first time, efficient non-formaldehyde containing dispersion systems, which are especially appropriate for wood applications.

In addition, the present invention has succeeded in providing efficient nanocomposite dispersions having improved light-absorbing properties and/or improved mechanical properties and/or improved barrier properties when used in wood application when used in wood applications, e.g. in coatings, paints, lacquers, adhesives etc.

Thus, applicants have successfully developed inorganic nanoparticles by molecular manufacturing, especially specific modification, which surface-modified particles have an light-absorption in the range from 250 to 440 nm and are well dispersible both in organic and also in water-based clear coating formulations, giving a transparent coating film in the visible part of the UV-VIS spectrum. Due to the specific surface-modification, the surface-modified inorganic nanoparticles as developed by applicants are suitable to be incorporated in any kind of polymeric binders, e.g. for clear coating application, in order to get a well-dispersed system and thus to give a transparent coating film in the visible part of the UV-VIS spectrum.

The dispersions and nanocomposite particles of the present invention are appropriate to formulate clear coating systems and adhesive systems with suitable wet state properties (i.e. rheology and wetting of wood, for example) and dry state properties (i.e. film formation and adhesion to wood, for example) and with high transparency and long service-life of coated wood panels (e.g. estimated from accelerated weathering tests).

The dispersions and nanocomposite particles of the present invention are also appropriate to produce water-based wood adhesives with significantly improved properties, such as e.g. low creep of corresponding wood joints, temperature resistance of corresponding wood joints, formaldehyde-freedom.

According to the present invention, the surface-modified inorganic nanoparticles providing UV-absorbing and mechanical properties are so to speak immobilized within the polymeric hybrid particles, thus eliminating the potential risk of aggregation and redispersion problems.

Emulsion polymerization, as performed in step (c) of the method of the present invention, especially in the form of miniemulsion polymerization, additionally provides a unique possibility of controlling the conversion, the particle size, the particle size distribution and the particle morphology of the resulting organic-inorganic hybrid nanoparticles.

As described hereinbefore, the method of the present invention comprises at least three different steps (a), (b) and (c).

With respect to the inorganic particles provided in step (a) of the inventive method, the following embodiments apply:

Generally, the inorganic nanoparticles may be formed of metal or semimetal oxides, metal or semimetal hydroxides, metal or semimetal oxide hydroxides, metal or semimetal oxyhydroxides, metal or semimetal carbides, metal or semimetal nitrides, metal or semimetal sulfides, metal or semimetal tellurides, metal or semimetal selenides, metal or semimetal halides, metal or semimetal carbonates, metal or semimetal phosphates, metal or semimetal sulfates, metal or semimetal silicates, metal or semimetal borates, metal or semimetal vanadates, metal or semimetal tungstates, metal or semimetal aluminates, apatites, zeolites, graphenes, carbon nanotubes and carbon blacks as well as combinations and mixtures of these compounds and mixed compounds and alloys of different metals and/or semimetals.

According to a particular embodiment of the present invention, the inorganic nanoparticles may be formed of optionally doped inorganic metal or semimetal oxides, optionally doped inorganic metal or semimetal hydroxides, optionally doped inorganic metal or semimetal oxide hydroxides, optionally doped inorganic metal or semimetal oxyhydroxides, optionally doped inorganic metal or semimetal sulfates, optionally doped inorganic metal or semimetal phosphates, optionally doped inorganic metal or semimetal sulfides, optionally doped inorganic metal or semimetal selenides, optionally doped inorganic metal or semimetal tellurides, optionally doped inorganic metal or semimetal halides, optionally doped inorganic metal or semimetal carbonates, optionally doped inorganic metal or semimetal nitrides, optionally doped inorganic metal or semimetal silicates, optionally doped inorganic metal or semimetal carbides, clays, apatites, zeolites, carbon nanotubes, graphenes, carbon blacks as well as combinations and mixtures of these compounds and mixed compounds and alloys of different metals and/or semimetals. The dopant may be selected from rare earth metals, especially lanthanoids. Furthermore, the dopant may be present in the range from 0.5 to 80 mole %, especially in the range from 5 to 60 mole %, preferably in the range from 10 to 40 mole %, based on the inorganic nanoparticles.

According to yet another embodiment of the present invention, the inorganic nanoparticles may be formed of optionally doped oxides, hydroxides and/or oxide hydroxides of aluminum, silicon, zinc, titanium, cerium and/or iron, optionally doped alkaline earth metal sulfates, optionally doped alkaline earth metal phosphates, transition metal phosphates or lanthanoid phosphates, optionally doped alkali metal vanadates, alkaline earth metal vanadates, transition metal vanadates or lanthanoid vanadates, optionally doped alkali metal fluorides, alkaline earth metal fluorides, transition metal fluorides or lanthanoid fluorides, cadmium sulfides or zinc sulfides, zinc selenides or cadmium selenides, cadmium tellurides or bismuth tellurides, optionally doped alkaline earth metal carbonates, aluminum nitrides or silicon nitrides, optionally doped alkaline earth metal silicates, clays, silicon carbides, silver, carbon nanotubes, graphenes, carbon blacks or other carbon allotropes as well as combinations and mixtures of these compounds and mixed compounds and alloys of different metals and/or semimetals. The dopant may be selected from rare earth metals, especially lanthanoids. The dopant may be present in the range from 0.5 to 80 mole %, especially in the range from 5 to 60 mole %, preferable in the range from 10 to 40 mole %, based on the inorganic nanoparticles.

According to a further embodiment of the present invention, the inorganic nanoparticles may be formed of $TiO_2$, ZnO, $Al_2O_3$, $SiO_2$, $CeO_2$, $Fe_2O_3$, $Fe_3O_4$, $Al(OH)_3$, Al(O)OH, alkaline earth metal sulfates, alkaline earth metal phosphates, optionally doped $YVO_4$, $NaYF_4:Yb_3Er$, optionally doped YbF, optionally doped $CaF_2$, optionally doped cerium phosphates, optionally doped lanthanum phosphates, zinc phosphates, barium titanates, antimony/tin oxides, indium/tin oxides, copper oxides, optionally doped $CaWO_4$, optionally doped $Yb_2(WO_4)_3$, optionally doped $Y_2(WO_4)_3$, cadmium sulfides, zinc sulfides, alkaline earth metal carbonates, AlN, $Si_3N_4$, alkaline earth metal silicates, SiC, clays, carbon nanotubes, graphenes, silver as well as combinations and mixtures of these compounds and mixed compounds and alloys of different metals and/or semimetals. The dopant may be selected from rare earth metals, especially lanthanoids. The dopant may be present in the range from 0.5 to 80 mole %, especially in the range from 5 to 60 mole %, preferable in the range from 10 to 40 mole %, based on the inorganic nanoparticles.

According to a preferred embodiment of the present invention, the inorganic nanoparticles may be formed of aluminum oxides, aluminum oxides hydroxides, aluminum hydroxides, titanium dioxide, silicon dioxides, optionally doped zinc oxides, optionally doped cerium oxides, iron oxides, iron/cerium oxides, clays, boehmite, silicates, carbon nanotubes, graphenes as well as combinations and mixtures of these compounds and mixed compounds and alloys of different metals and/or semimetals. The dopant may be selected from rare earth metals, especially lanthanoids. The dopant may be present in the range from 0.5 to 80 mole %, especially in the range from 5 to 60 mole %, preferable in the range from 10 to 40 mole %, based on the inorganic nanoparticles.

On the basis of the abovementioned inorganic particles, particularly efficient results may be reached within the scope of the present invention. Especially, the aforementioned inorganic nanoparticles ensure excellent light-absorbing and/or mechanical properties and/or barrier properties as well as an efficient processability within the polymerization step (c).

The particles sizes of the inorganic nanoparticles provided in step (a) of the inventive method may vary in a very broad range:

Usually, the inorganic nanoparticles may have particle sizes, especially in at least one dimension, in the range from 0.1 to 2,000 nm, especially in the range from 0.5 to 1,500 nm, preferably in the range from 1 to 1,000 nm, more preferably in the range from 2 to 800 nm, even more preferably in the range from 5 to 600 nm.

Generally, the inorganic nanoparticles may have average particle sizes, especially D50 values, especially in at least one dimension, in the range from 0.5 to 1,000 nm, especially in the range from 2 to 800 nm, preferably in the range from 5 to 700 nm, more preferably in the range from 10 to 600 nm, even more preferably in the range from 15 to 500 nm.

The determination of the particle sizes may be performed according to any conventional manner well known to the skilled practitioner from the prior art, especially e.g. by light-scattering, laser diffraction, transmission electron microscopy, analytical ultracentrifugation etc.

On the basis of the abovementioned particle sizes, particularly efficient results may be reached within the scope of the present invention. Especially, particles having these particle sizes provide particularly efficient light-absorbing and mechanical properties, are easily dispersible after inventive surface-modification and can be easily processed on behalf of the inventive polymerization step.

Generally, the inorganic nanoparticles provided in step (a) of the inventive method may be amorphous, semicrystalline, crystalline or polycrystalline, preferably crystalline or polycrystalline, more preferably crystalline. Crystallinity may be measured by conventional methods well known to the skilled practitioner, such as e.g. X-ray diffraction, neutron diffraction etc.

The shape of the inorganic nanoparticles provided in step (a) of the inventive method may also vary over a very broad range: Generally, the inorganic nanoparticles have a granular, spherical, elongated or plate-like shape, preferably a spherical shape. According to the present invention it is preferred if the inorganic nanoparticles exhibit aspect ratios, calculated as the ratio of the width to the height of the inorganic nanoparticles, in the range from 1 to 10,000, especially greater than 1, preferably greater than 10, more preferably greater than 100. In this context, it has to be noted that, with higher aspect ratios, the mechanical properties may be improved.

With respect to the production of the inorganic nanoparticles provided in step (a) of the inventive method, such inorganic nanoparticles can be provided by any method known to the skilled practitioner in the art. For instance, the inorganic nanoparticles, especially the dispersion comprising the inorganic nanoparticles, in step (a) of the inventive method may be provided by precipitation methods, mechanochemical processing methods, comminution methods, sol-gel methods, hydrothermal or solvothermal methods, physical vapor deposition methods, chemical vapor deposition methods, flame pyrolysis methods, decomposition methods or combustion synthesis, preferably by precipitation methods. Principally, all of these methods are well-known to the skilled practitioner and will be illustrated, in more detail, in the Examples, of the present invention.

As mentioned before, step (a) of the inventive method is followed by a method step (b) where the inorganic nanoparticles, especially the dispersion comprising the inorganic nanoparticles, resulting from step (a) are subjected to a surface modification, wherein the surface modification comprises an at least two-stage surface treatment comprising: (i) one stage where the inorganic nanoparticles are contacted with at least one dispersing agent and (ii) another stage where the inorganic particles are provided with functional groups on their surfaces, especially via chemical reaction.

According to a particular embodiment, in step (b), the surface treatment stage (i) comprising contacting the inorganic nanoparticles with at least one dispersing agent is performed by adding the at least one dispersing agent to the dispersion of the inorganic nanoparticles, followed by homogenizing the resulting dispersion and contacting the inorganic nanoparticles with the at least one dispersing agent for a time sufficient to allow for an interaction between the surface of the inorganic nanoparticles and the dispersing agent, thus modifying the surface of the inorganic nanoparticles by the dispersing agent. Especially, the surface treatment stage (i) is performed with introduction of energy input, particularly by means of ultrasound treatment; particularly, the surface treatment stage (i) is performed with an energy amount introduced, calculated as energy introduced per inorganic nanoparticles amount, between 5,000 to 500,000 kJ/kg, in particular between 10,000 to 250,000 kJ/kg, preferably between 15,000 to 100,000 kJ/kg, more preferably between 25,000 to 50,000 kJ/kg. On the one hand, the energy input introduced must be sufficient to provide the energy needed for dispersing, especially in order to disrupt possible agglomerates, conglomerates etc.; on the other hand, a certain level should not be exceeded since otherwise destruction of the particles may occur, followed by undesired reagglomeration or other unwanted side-effects.

According to a further embodiment, in step (b), the dispersing agent used is a polymeric dispersant. Especially, the dispersing agent may be based on a functionalized polymer, preferably having a number-average molecular weight of at least 500 g/mol, preferably at least 1,000 g/mol, more preferably at least 2,000 g/mol, even more preferably in the range from 2,000 to 10,000,000 g/mol. On the basis of these molecular weights, particularly efficient results may be reached within the scope of the present invention. For the determination of the molecular weights, usual conventional methods well known to the skilled practitioner, such as e.g. gel permeation chromatography (GPC), especially GPC according to DIN 55672, using e.g. polystyrene and/or polymethylmethacrylate as the internal standard.

According to the particular embodiment of the present invention, in step (b), the dispersing agent used may be selected from the group consisting of polymers and copolymers having functional groups and/or groups with pigment affinity, alkylammonium salts of polymers and copolymers, polymers and copolymers having acidic groups, comb copolymers and block copolymers such as block copolymers having groups with pigment affinity, especially basic groups with pigment affinity, optionally modified acrylate block copolymers, optionally modified polyurethanes, optionally modified and/or salified polyamines, phosphoric esters, ethoxylates, polymers and copolymers having fatty acid radicals, optionally modified polyacrylates such as transesterified polyacrylates, optionally modified polyesters, such as acid-functional polyesters, polyphosphates and mixtures thereof.

In an inventively preferred way the compounds selected as dispersing agents are especially those compounds of the kind described in publications EP 1 593 700 B1, EP 0 154 678 B1, EP 0 318 999 B1, EP 0 270 126 B1, EP 0 893 155 B1, EP 0 417 490 B1, EP 1 081 169 B1, EP 1 650 246 A1, EP 1 486 524 A1, EP 1 640 389 A1, EP 0 879 860 B1, WO 2005/097872 A1 and EP 1 416 019 A1, the respective disclosure contents of which are hereby incorporated in full by reference.

For further details with respect to the dispersing agents to be used within the scope of the present invention, reference may also be made to the inventive Examples.

According to a further embodiment, in step (b), the dispersing agent may be used in amounts in the range from 5 to 500% by weight, especially in the range from 10 to 400% by weight, preferably in the range from 25 to 300% by weight, more preferably in the range from 35 to 200% by weight, even more preferably in the range from 50 to 150% by weight, based on the inorganic nanoparticles. On the basis of the aforementioned amounts of dispersing agents, particularly efficient results may be reached within the scope of the present invention. On the one hand, lower amounts do not provide sufficient modification whereas, on the other hand, higher amounts do not provide additional effects or may even be detrimental.

According to the present invention, in step (b), the surface treatment stage (i) comprising contacting the inorganic nanoparticles with at least one dispersing agent may be performed for a duration from 0.001 to 24 hours, especially 0.01 to 12 hours, preferably 0.1 to 6 hours, and/or in a temperature range from 0 to 150° C., especially 5 to 100° C., preferably 10 to 80° C., more preferably 15 to 60° C.

As delineated before, step (b) also comprises another surface treatment stage (ii) where the inorganic nanoparticles are provided with functional groups on their surfaces, especially via chemical reaction (i.e. the functional groups are preferably bonded via covalent bondings to the inorganic nanoparticle surfaces).

According to the present invention, in step (b), by the surface treatment stage (ii) the inorganic nanoparticles are provided with functional groups which are compatible with and/or reactive with the polymerizable monomers used in step (c).

According to a particular embodiment, in step (b), by the surface treatment stage (ii) the inorganic nanoparticles may be provided with functional groups selected from isocyanate groups, urethane groups, carbamate groups, epoxy groups, carboxylic acid groups, carboxylic acid anhydride groups, carboxylate groups, hydroxy groups, thiol groups, amine groups, organic groups comprising carbon-carbon double bonds, vinyl groups, ethylenically unsaturated groups, acrylate groups, methacrylate groups, alkyl groups, alkenyl groups, alkinyl groups, aryl groups, aralkyl groups, cycloalkyl groups, cycloalkylene groups, halogens, alkoxy groups, acyloxy groups and combinations thereof.

According to a further particular embodiment, in step (b), the surface treatment stage (ii) comprising providing the inorganic nanoparticles with functional groups on their surfaces may be performed by contacting and/or reacting the inorganic nanoparticles with at least one surface-modification agent comprising functional groups. Especially, the surface-modification agent comprising functional groups may be selected from the group consisting of silanes, especially organofunctional silanes, preferably organofunctional silanes comprising at least one functional group selected from isocyanate groups, urethane groups, carbamate groups, epoxy groups, carboxylic acid groups, carboxylic acid anhydride groups, carboxylate groups, hydroxy groups, thiol groups, amine groups, organic groups comprising carbon-carbon double bonds, vinyl groups, ethylenically unsaturated groups, acrylate groups, methacrylate groups, alkyl groups, alkenyl groups, alkinyl groups, aryl groups, aralkyl groups, cycloalkyl groups, cycloalkylene groups, halogens, alkoxy groups, acyloxy groups; carboxylic acids; carboxylic acid anhydrides; carboxylates; and combinations thereof.

As delineated before, one way to introduce surface reactivity to the nanoparticles according to the present invention on behalf surface treatment stage (ii) of method step (b) is the treatment of the inorganic nanoparticles with at least one organofunctional silane.

Organofunctional silanes which can be used according to the present invention are silanes having one, two, three or more hydrolyzable radicals. With regard to the compatibility and the reactivity of the silanes, however, silanes having at least three hydrolyzable radicals, preferably having three hydrolyzable radicals, are employed with preference.

Generally, organofunctional silanes useful for the present invention may be represented by the structural formula (I)

$$R^S_n\text{—Si—}R^V_m X_{4-(n+m)} \quad (I),$$

wherein:
the groups $R^S$, identical or different, represent organic radicals having at least one functional group, more particularly linear and/or branched alkylene or cycloalkylene radicals and having 1 to 20 carbon atoms and having at least one functional group G', especially alkylene radicals having 1 to 4 carbon atoms and having at least one functional group G';
$R^V$ is alkyl, cycloalkyl, aryl or aralkyl, the carbon chain optionally being interrupted by nonadjacent oxygen, sulfur or NRa groups, with Ra=alkyl, cycloalkyl, aryl or aralkyl, preferably R=alkyl radical, more particularly having 1 to 6 C atoms;
n=1 to 3, preferably 1 to 2, more preferably n=1;
m=0 to 2, preferably 0 to 1, more preferably m=0;
with 1≤n+m≤3, preferably 1≤n+m≤2, more preferably n+m=1;
the groups X, identical or different, are hydrolyzable groups, especially wherein the hydrolyzable groups X, identical or different, may be selected from the group of halogens, more particularly chlorine and bromine, from the group of alkoxy groups, from the group of alkylcarbonyl groups, and from the group of acyloxy groups, especially wherein alkoxy groups are particularly preferred, especially wherein the alkoxy groups preferably have 1 to 6 carbon atoms, preferably 1 to 3, more preferably 1 or 2 carbon atoms.

Alkoxysilanes employed with particular preference may be represented by the formula (II)

$$R^S_n\text{—Si—}R^V_m(OR)_{4-(n+m)} \quad (II)$$

wherein:
n=1 to 3, preferably n=1 to 2, more preferably n=1;
m=0 to 2, preferably 0 to 1, more preferably m=0;
with 1≤n+m≤3, preferably 1≤n+x≤2, more preferably n+m=1;
$R^V$=alkyl, cycloalkyl, aryl, or aralkyl, the carbon chain optionally being interrupted by nonadjacent oxygen, sulfur or NRa groups, with Ra=alkyl, cycloalkyl, aryl or aralkyl, preferably Ra=alkyl radical, more particularly having 1 to 6 C atoms;
$R^S$=organic radical having at least one functional group G', more particularly linear and/or branched alkylene or cycloalkylene radicals having 1 to 20 carbon atoms and having at least one functional group G', especially alkylene radicals having 1 to 4 carbon atoms and having at least one functional group G';
R=hydrogen, alkyl or cycloalkyl, the carbon chain optionally being interrupted by nonadjacent oxygen, sulfur or NRa groups, with Ra=alkyl, cycloalkyl, aryl or aralkyl, preferably R=alkyl radical, more particularly having 1 to 6 C atoms.

The respective preferred alkoxy radicals may be identical or different. What is critical for the structure of the radicals, however, is to what extent they influence the reactivity of the hydrolyzable silane groups. Preferably R is an alkyl radical, more particularly having 1 to 6 C atoms.

Particularly preferred are radicals R which raise the reactivity of the silane groups, i.e. which represent appropriate leaving groups. Consequently a methoxy radical is preferred over an ethoxy radical, which in turn is preferred over a propoxy radical. With particular preference, therefore, R=ethyl and/or methyl, more particularly methyl.

Generally, however, less-reactive silanes can also be employed. In these cases it is necessary to achieve a sufficient crosslinking density, either by means of a correspondingly more efficient catalyst or else a correspondingly higher amount of catalyst must be added.

Nonfunctional substituents on the organofunctional silanes, more particularly substituents on the radical $R^S$, may also influence its reactivity. This may be illustrated by way of example, taking as an example bulky voluminous substituents on the amine function, which are able to reduce the reactivity of amine-functional silanes. Against this background, N-(n-butyl)-3-aminopropyltrimethoxysilane is preferred before N-cyclohexyl-3-aminopropyltrimethoxysilane.

The reactivity of organofunctional silanes can also be significantly influenced, furthermore, through the length of the spacers between silane functionality and organic functional groups G'. As examples of this, mention may be made of the "alpha" silanes, which are available from Wacker Chemie GmbH, Germany, and in which there is a methylene group instead of the propylene group present, in the case of "gamma" silanes, between Si atom and functional group. To illustrate this, it is observed that methacryloyloxymethyltrimethoxysilane ("alpha" silane, e.g. commercial product GENIOSIL® XL 33 from Wacker Chemie GmbH) is used with preference over methacryloyloxypropyltrimethoxysilane ("gamma" silane, e.g. commercial product GENIOSIL® GF 31 from Wacker Gmbh) for the synthesis of the corresponding adducts also useful for the present invention.

Generally, spacers which raise the reactivity of the silanes are preferred over spacers which lower the reactivity of the silanes.

The aforementioned reactive groups G' of the above silanes are preferably selected from the group consisting of amine, epoxy, anhydride, isocyanate, carbamate, thiol groups and/or groups containing ethylenically unsaturated double bonds.

Listed hereinafter, by way of example but without limitation, are inventively preferred organofunctional silanes which are particularly suitable for the modification or the inorganic nanoparticles:

For example, according to the present invention, there may be used amine-functional and thiol-functional silanes: In this respect, use is made, especially in the context of Michael additions, of, for example, primary aminosilanes, such as 3-aminopropyltriethoxysilane (available for example under the brandname Geniosil® GF 93 from Wacker Chemie GmbH), 3-aminopropyltrimethoxysilane (available for example under the brandname Geniosil® GF 96 from Wacker Chemie GmbH), N-(2-aminoethyl)-3-aminopropyltrimethoxysilane (available for example under the brandname Geniosil® GF 9 and also Geniosil® GF 91 from Wacker Chemie), N-(2-aminoethyl)-3-aminopropylmethyldimethoxysilane (available for example under the brandname Geniosil® GF 95 from Wacker Chemie GmbH) and the like. Use may also be made, particularly in the context of additions to isocyanate functional compounds, of, for example, secondary aminosilanes and mercapto-functional silanes, such as, for example, bis(2-trimethoxysilylethyl)amine, bis(2-triethoxysilylethyl)amine, bis(3-triethoxysilylpropyl)amine (available under the tradename Dynasylan® 1122 from Evonik Industries AG), bis(3-trimethoxysilylpropyl)amine (available under the tradename Dynasylan® 1124 from Evonik Industries AG), bis(4-triethoxysilylbutyl)amine, N-(n-butyl)-3-aminopropyltrimethoxysilane (available under the tradename Dynasylan® 1189 from Evonik Industries AG), N-(n-butyl)-3-aminopropyltriethoxysilane, N-cyclohexyl-3-aminopropyltrimethoxysilane (available under the brandname Geniosil® GF 92 from Wacker Chemie GmbH), N-cyclohexyl-3-aminopropyltriethoxysilane, 3-mercaptopropyltrimethoxysilane (available from Evonik Industries AG under the tradename Dynasylan® MTMO), 3-mercaptopropyltriethoxysilane, N-cyclohexylaminomethylmethyldiethoxysilane (available from Wacker Chemie GmbH under the tradename Geniosil® XL 924), N-cyclohexylaminomethyltriethoxysilane (available from Wacker Chemie GmbH under the tradename Geniosil® XL 926), N-phenylaminomethyltrimethoxysilane (available from Wacker Chemie GmbH under the tradename Geniosil® XL 973), and the like.

For example, according to the present invention, there may also be used epoxy-functional silanes: Epoxy-functional silanes can be used in particular for addition to carboxylic acid-functional or anhydride-functional compounds. Examples of suitable epoxy-functional silanes are 3-glycidyloxypropyltrimethoxysilane (available from Evonik Industries AG under the tradename Dynasylan® GLYMO), 3-glycidyloxypropyltriethoxysilane (available from Evonik Industries AG under the tradename Dynasylan® GLYEO), and the like.

For example, according to the present invention, there may also be used anhydride-functional silanes: Anhydride-functional silanes can be used in particular for addition to epoxy-functional compounds. An example that may be mentioned of a silane with anhydride functionality is 3-(triethoxysilyl)propylsuccinic anhydride (available from Wacker Chemie GmbH under the tradename Geniosil® GF 20).

For example, according to the present invention, there may also be used silanes with ethylenically unsaturated double bonds: Silanes of this kind can be used in the context of Michael reactions or else in the context of metal-catalyzed reactions or else in radical polymerization reactions. Those exemplified are 3-methacryloyloxypropyltrimethoxysilane (available for example from Evonik Industries AG under the tradename Dynasilan® MEMO, or from Wacker Chemie GmbH under the tradename Geniosil® GF 31), 3-methacryloyloxypropyltriethoxysilane, vinyltrimethoxysilane (available from, among others, Wacker Chemie GmbH under the tradename Geniosil® XL 10), vinyldimethoxymethylsilane (available from, among others, Wacker Chemie GmbH under the tradename Geniosil® XL 12), vinyltriethoxysilane (available from, among others, Wacker Chemie GmbH under the tradename Geniosil® GF 56), (methacryloyloxymethyl)methyldimethoxysilane (available from, among others, Wacker Chemie GmbH under the tradename Geniosil® XL 32), methacryloyloxymethyltrimethoxysilane (available from, among others, Wacker Chemie GmbH under the tradename Geniosil® XL 33), (methacryloyloxymethyl)methyldiethoxysilane (available from, among others, Wacker Chemie GmbH under the tradename Geniosil® XL 34), and methacryloxymethyltriethoxysilane (available from, among others, Wacker Chemie GmbH under the tradename Geniosil® XL 36).

For example, according to the present invention, there may also be used silanes with isocyanato function or carbamate function: Silanes with isocyanato function or carbamate function are employed in particular in the context of reactions with hydroxyl-functional compounds. Examples of silanes with isocyanato function are, for example, described in US 2007/0123621 A1 or WO 2007/037857 A1 respectively. Examples of suitable isocyanatoalkyltrialkoxysilanes are isocyanatopropyltrimethoxysilane, isocyanatopropylmethyldimethoxysilane, isocyanatopropylmethyldiethoxysilane, isocyanatopropyltriethoxysilane, isocyanatopropyltriisopropoxysilane, isocyanatopropylmethyldiisopropoxysilane; isocyanatoneohexyltrimethoxysilane, isocyanatoneohexyldimethoxysilane, isocyanatoneohexyldiethoxysilane, isocyanatoneohexyltriethoxysilane, isocyanatoneohexyltriisopropoxysilane, isocyanatoneohexyldiisopropoxysilane, isocyanatoisoamyltrimethoxysilane, isocyanatoisoamylmethyldimethoxysilane, isocyanatoisoamylmethyldiethoxysilane, isocyanatoisoamyltriethoxysilane, isocyanatoisoamyltriisopropoxysilane, and isocyanatoisoamylmethyldiisopropoxysilane. Many isocyanatoalkyltri- and dialkoxysilanes are available commercially, for example, under the designation Silquest® from Momentive Performance Materials, Inc., United States of America. The isocyanatopropylalkoxysilane used preferably has a high degree of purity, more particularly a purity of at least 95%, and is preferably free from additives, such as transesterification catalysts, which can lead to unwanted side reactions. Use is made in particular of (isocyanatomethyl)methyldimethoxysilane (available from Wacker Chemie GmbH under the brandname Geniosil® XL 42), 3-isocyanatopropyltrimethoxysilane (available from Wacker Chemie GmbH under the brandname Geniosil® XL 40) and N-dimethoxy(methyl)silylmethyl O-methylcarbamate (available from Wacker Chemie GmbH under the brandname Geniosil® XL 65).

An additional embodiment of the present invention is the combination of at least one organofunctional silane with at least one non-functional silane for the surface treatment stage (ii) of step (b).

Examples for non-functional silanes which may be employed with particular preference may be represented by the formula III

(III)

wherein:

$R^V$ is alkyl, cycloalkyl, aryl or aralkyl, the carbon chain optionally being interrupted by nonadjacent oxygen, sulfur or NRa groups, with Ra=alkyl, cycloalkyl, aryl or aralkyl, preferably R=alkyl radical, more particularly having 1 to 6 C atoms;
n=1 to 3, preferably 1 to 2, more preferably n=1;
m=0 to 2, preferably 0 to 1, more preferably m=0;
with 1≤n+m≤3, preferably 1≤n+m≤2, more preferably n+m=1;
the groups X, identical or different, are hydrolyzable groups, especially wherein the groups X may be selected from the group of halogens, more particularly chlorine and bromine, from the group of alkoxy groups, from the group of alkylcarbonyl groups, and from the group of acyloxy groups, especially wherein alkoxy groups are particularly preferred, especially wherein the alkoxy groups preferably have 1 to 6 carbon atoms, preferably 1 to 3, more preferably 1 or 2 carbon atoms.

All surface treatments of surface treatment stage (ii) of step (b) of the inventive method, especially all silane treatments, can principally be carried out in a dry treatment process or in a liquid media, especially in dispersion.

Another way to introduce a surface reactivity of the inorganic nanoparticles can be easily achieved when the nanoparticles are dispersed in a liquid medium. During formation of the nanoparticle dispersion, usually wetting and dispersing additives may be needed to achieve the desired properties of the dispersion.

According to the present invention, the use of at least one wetting and/or dispersing additive, which is carrying a suitable chemical functionality, may be suitable to render the surface of the particles compatible with the polymerizable monomers (see above explanations with respect to surface modification step (i)).

| Functional group of modified nanoparticle surface | Suitable polymerization system |
|---|---|
| Isocyanates, blocked isocyanates | Hydroxyl, amine containing system |
| Urethane | Hydroxyl, amine containing system |
| Carbamate | Hydroxyl, amine containing system |
| Epoxy | Carboxylic acid, carboxylic acid anhydride, epoxy, hydroxyl, amine containing system |
| Carboxylic acid, carboxylic acid anhydride | Epoxy, hydroxyl, amine containing system |
| Hydroxyl | Isocyanate, carboxylic acid, carboxylic acid anhydride |
| C=C double bond containing system | Amine, C=C double bond containing system |
| Amine | Carboxylic acid, carboxylic acid anhydride, C=C double bond containing system |
| Thiol | Carboxylic acid, carboxylic acid anhydride, C=C double bond containing system |

By way of example, the chemical functionality of wetting and/or dispersing agents may be selected from acidic groups, like carboxylic or phosphoric or phosphonic acid groups; basic groups like aminic or polyaminic groups; salined aminic or polyaminic groups; hydroxy groups; acrylate groups or methacrylate groups. For further details, reference may be made to the above explanations.

As delineated before, the functional groups, with which the inorganic nanoparticles are provided on behalf of the surface treatment stage (ii), are to be selected such that they are compatible with and/or reactive with the polymerizable monomers used in step (c) and thus with the resulting polymers obtained in step (c) in order that the nanoparticles can be homogeneously distributed and incorporated into the resulting polymer matrix.

Examples for compatible and/or reactive pairs of functional groups on the modified nanoparticle surfaces, on the one hand, and the polymerizable monomers/suitable polymerization system are exemplified in the following, however, without being restrictive.

As delineated hereinafter, appropriate functionalities of the nanoparticles on behalf of surface treatment stage (ii) are provided or introduced, respectively, by an appropriate surface-modification agent, preferably via chemical reaction.

In general, the surface reactivity and/or modification of the inorganic nanoparticles provided in method step (b) should be suitable to the "downstream" process, especially with respect to method step (c). Suitable particle reactivities and/or modifications and "downstream" process pairs are given in the above table.

Beside introducing chemical functionalities to the inorganic nanoparticle surface, it may be needed to put also a non-reactive surface treatment on the nanoparticle surface to achieve the desired compatibility in the desired final application. One way to achieve such a kind of non-functional treatment is by using non-functional organosilanes as explained before. Another alternative to render a material more organophilic is to use tenside-like structures (i.e. e.g. ionic or non-ionic tensides) without any chemical functionality in the backbone as a surface treatment or to use wetting and/or dispersing agents comprising higher molecular weights, which do not add chemical functionality to the inorganic nanoparticle surface.

According to the present invention, in step (b), the surface treatment stage (ii) comprising providing the inorganic nanoparticles with functional groups on their surfaces is performed by contacting and/or reacting the inorganic nanoparticles with at least one surface-modification agent comprising functional groups, especially while homogenizing and/or introducing energy input, particularly by means of ultrasound treatment and/or particularly with an energy amount introduced per inorganic nanoparticles amount, between 0.1 to 100,000 kJ/kg, in particular between 0.5 and 50,000 kJ/kg, preferably between 1 to 10,000 kJ/kg, more preferably between 2 to 5,000 kJ/kg. With respect to the energy input and the respective limits, reference can be made to the above explanations.

In the context of the present invention, in step (b), the surface treatment stage (ii) comprising providing the inorganic nanoparticles with functional groups on their surfaces may be performed by contacting and/or reacting the inorganic nanoparticles with at least one surface-modification agent comprising functional groups. Especially, the surface-modification agent comprising functional groups may be used in amounts in the range from 0.0001 to 100% by weight, especially in the range from 0.001 to 50% by weight, preferably in the range from 0.01 to 25% by weight, more preferably in the range from 0.1 to 10% by weight, even more preferably in the range from 0.2 to 5% by weight, based on the inorganic nanoparticles. On the basis of the aforementioned amounts of surface-modification agents, particularly efficient results may be reached within the scope of the present invention. On the one hand, a certain level is necessary to reach a sufficient effect, whereas, on the other hand, excessive amounts do not provide any further effect or are even detrimental.

According to the present invention, in step (b), the surface treatment stage (ii) comprising providing the inorganic nanoparticles with functional groups on their surfaces may be performed for a duration from 0.001 to 24 hours, especially 0.01 to 12 hours, preferably 0.1 to 6 hours, and/or in a temperature range from 0 to 150° C., especially 5 to 100° C., preferably 10 to 80° C., more preferably 15 to 60° C.

With respect to the different stages of the surface treatment in step (b), these different stages may be performed simultaneously or subsequently, preferably subsequently, especially in arbitrary order, preferably with the stage where the inorganic nanoparticles are contacted with the at least one dispersing agent being performed before the stage where the inorganic nanoparticles are provided with functional groups on their surfaces.

According to a particular embodiment of the present invention, the surface modification according to step (b) may comprise (iii) a further stage of surface treatment where the inorganic nanoparticles are contacted with at least one non-polymeric and/or non-reactive surface-modifier. Especially, the non-polymeric and/or non-reactive surface-modifier may be selected from emulsifiers or surfactants, especially quarternary ammonium salts, sulfates, sulfonates, phosphates or phosphonates each comprising ionic or non-ionic emulsifying groups, Lewis acids and Lewis bases, alkoxylates of fatty alcohols, organic acids and anhydrides or esters of organic acids, as well as combinations thereof.

Generally, according to the present invention, the overall step (b) may be performed for a duration from 0.01 to 48 hours, especially 0.1 to 20 hours, preferably 0.5 to 10 hours, and/or in a temperature range from 0 to 100° C., especially 5 to 75° C., preferably 10 to 60° C., more preferably 15 to 50° C.

Generally, according to the present invention, the overall step (b) may be preferably performed by introducing a total energy input, calculated as the total energy amount introduced during the overall step (b) per inorganic nanoparticles amount, between 5,000 to 1,000,000 kJ/kg, in particular between 10,000 and 500,000 kJ/kg, preferably between 15,000 to 200,000 kJ/kg, more preferably between 25,000 to 100,000 kJ/kg.

According to the present invention, the energy input in step (b), especially in the different stages of step (b), may be independently performed by ultrasound treatment (ultrasonication), mixing, shearing, stirring, milling or combinations thereof.

As delineated above, step (b) is followed by a step (c) where the surface-modified inorganic nanoparticles, especially the dispersion comprising the surface-modified inorganic nanoparticles, resulting from step (b) are combined with at least one kind of polymerizable monomers, followed by a polymerization of the polymerizable monomers in the presence of the surface-modified inorganic nanoparticles, especially via emulsion polymerization, thus resulting in a nanocomposite dispersion comprising composite particles of inorganic nanoparticles and organic polymers in a continuous phase, especially in a dispersion medium.

According to the present invention, in step (c), polymerization may be performed in a temperature range from 5 to 200° C., especially in the range from 10 to 180° C., preferably in the range from 15 to 100° C., more preferably in the range from 20 to 80° C., and/or for a duration in the range from 0.01 to 48 hours, especially 0.1 to 24 hours, preferably 0.2 to 12 hours, more preferably 0.5 to 10 hours.

Generally, in step (c), polymerization may be performed by polymerizing the polymerizable monomers in the presence of the surface-modified inorganic nanoparticles and, optionally, in the presence of at least one polymerization initiator.

Especially polymerization may be performed as an at least two-stage polymerization process comprising a first stage producing a seed of composite particles of inorganic nanoparticles and organic polymers, followed by a second stage where polymerization is continued, optionally finalized by a post-polymerization step. The second stage (i.e. continuation of polymerization) may especially be performed by feeding (neat) monomer and/or a reformed (pre-)emulsion of (neat) monomers and/or a monomer (mini-)emulsion optionally comprising modified nanoparticles.

Generally, in step (c), polymerization may be performed by polymerizing the polymerizable monomers in the presence of the surface-modified inorganic particles, using the polymerizable monomers and the surface-modified inorganic particles in an organic monomers/inorganic surface-modified nanoparticles weight ratio from 99.9:0.1 to 20:80, especially from 99.5:0.5 to 50:50, preferably from 99:1 to 60:40, more preferably from 98.5:1.5 to 80:20, even more preferably from 98:2 to 90:10.

Preferably, the polymerization in step (c) is performed by emulsion polymerization, especially miniemulsion polymerization. In miniemulsion, the monomer may be dispersed as nanodroplets, which can be assimilated to nanoreactors. Successful encapsulation by this method requires that the inorganic nanoparticles should be smaller than the monomer droplets and well dispersed within the oil phase before emulsification, to accommodate them into the miniemulsion droplets which are then converted to polymers. It is preferred when the inorganic nanoparticles stay at least essentially inside the polymer particles in order to avoid their enrichment at the film surface, which might lower adhesion.

According to a particular embodiment of the present invention, the nanocomposite dispersion of the present invention (e.g. in the form of an aqueous latex comprised in the inventive adhesive system) may be produced by way of emulsion polymerization as delineated before. Especially, for such polymerization there are basically three different processes available: batch, semi-continuous and continuous, wherein continuous or semi-continuous processing is preferred in the scope of the present invention. In a batch process all the reactants are added at the start of the reaction while in the semi-continuous process the components are added continuously throughout the reaction. In a continuous process, the components are added continuously during the process similarly to the semi-continuous process, but the product is removed at the same rate.

The polymerization procedure according to step (b) may be performed as well known in the art of emulsion polymerization. It may be carried out in an organic or aqueous medium, preferably in an aqueous medium at a pH in the range of 3 to 7. To maintain the pH of the reaction mixture, a buffer may be added as is known in the art; suitable buffers may include alkali metal acetates, alkali metal carbonates and alkali metal phosphates.

Usually, polymerization is performed in the presence of a polymerization initiator; the initiator system may, for example, be chosen among thermal initiators, redox initiators or combinations thereof, for example potassium- or ammonium persulfates, tert-butyl hydroperoxide, cumene hydroperoxide, tert-butyl perbenzoate, tert-butyl 2-ethyl perhexanoate, hydrogen peroxide and benzoyl peroxide. Azo-initiators are also appropriate. Either oil- and/or water-soluble initiators may be used. Suitable reducing agents of a redox initiator system may include compounds, such as sulphur compounds with a low oxidation state, such as sulfites, hydrogen sulfites, alkali metal bisulfites, ketone adducts of bisulfites, such as acetone bisulfite, alkali metal disulfites, metabisulfites and its salts, thiosulfates, formaldehyde sulfoxylates and its salts, reducing nitrogen compounds, such as hydroxylamines, hydroxylamine hydrosulfate and hydroxylammonium salts, polyamines and reducing sugars, such as sorbose, fructose, glucose, lactose and derivatives thereof, enediols, such as ascorbic acid and isoascorbic acid, sulfinic acids, hydroxy alkyl sulfinic acids, such as hydroxy methyl sulfinic acid and 2-hydroxy-2-sulfinactic acid and its salts. Redox initiators are typically used in combination with trace amounts of metal such as iron, for example supplied as ferrous sulfate.

As delineated in more detail hereinbelow, the polymerizable monomers used in method step (c) are preferably selected from ethylenically monomers, such as e.g. vinyl ester monomers (e.g. vinyl acetate monomers). The vinyl ester monomers, such as vinyl acetate monomers, may e.g. be copolymerized with other ethylenically unsaturated monomers, such as (meth)acrylate monomers or monomers comprising functional groups, such as carboxylic acid groups, carboxylic anhydride groups, N-alkylol or N-alkoxymethyl, glycidyl groups. More specific examples of functional groups include N-alkylol (meth)acrylamides, such as N-methylol (meth)acrylamide, and N-(alkoxymethyl) (meth)acrylates, such as N-(butoxymethyl) (meth)acrylamide or N-(iso-butoxymethyl) (meth)acrylamide, acrylic acid, methacrylic acid, crotonic acid, isocrotonic acid, itaconic acid, itaconic anhydride, maleic acid, maleic anhydride, vinyl benzoic acid, and fumaric acid.

The emulsion medium, i.e. the aqueous latex, may furthermore comprise a protective colloid comprising a polymer selected among, for instance, polyvinyl alcohol, hydroxyethyl cellulose, polyvinyl formamide, polyvinyl amine, a copolymer of two or more of said polymers and combinations thereof. The protective colloid may be combined with another emulsifying agent, such as an anionic or non-ionic surfactant. The protective colloid may act as a surfactant and/or as a grafting point (i.e. grafting point for polymerization).

With respect to the polymerizable monomers used in step (c), such polymerizable monomer may be an ethylenically unsaturated monomer.

According to a particular embodiment of the present invention the polymerizable monomer may be an ethylenically unsaturated monomer selected from the group consisting of (i) alkyl(meth)acrylates of linear, branched or cycloaliphatic alcohols comprising 1 to 22 carbon atoms, especially methyl(meth)acrylate, ethyl(meth)acrylate, n-butyl(meth)acrylate, iso-butyl(meth)acrylate, tert-butyl(meth) acrylate, lauryl(meth)acrylate, 2-ethylhexyl(meth)acrylate, stearyl(meth)acrylate, cyclohexyl(meth)acrylate, isobornyl (meth)acrylate, tert-butyl(meth)acrylate; (ii) aryl(meth)acrylate, especially benzyl(meth)acrylate or phenylacrylate, especially wherein the aryl radicals may be each unsubstituted or substituted with up to four substituents; (iii) (meth) acrylic acids, citraconic acid, crotonic acid, cinnamic acid, maleic acid and salts, anhydrides and esters thereof; (iv) hydroxyalkyl(meth)acrylates of linear, branched or cycloaliphatic diols comprising 2 to 36 carbon atoms, especially 3-hydroxypropyl(meth)acrylate, 3,4-dihydroxybutylmono (meth)acrylate, 2-hydroxyethyl(meth)acrylate, 4-hydroxybutyl(meth)acrylate, 2-hydroxypropyl(meth)acrylate, 2,5-dimethyl-1,6-hexandiolmono(meth)acrylate; (v) mono (meth)acrylates of ethers, polyethyleneglycols, polypropyleneglycols or mixed polyethylene/propylene glycols each comprising 5 to 80 carbon atoms, especially tetrahydrofurfuryl(meth)acrylate, methoxyethoxyethyl (meth)acrylate, 1-butoxypropyl(meth)acrylate, cyclohexyloxymethyl(meth)acrylate, methoxymethoxyethyl(meth) acrylate, benzyloxymethyl(meth)acrylate, furfuryl(meth) acrylate, butoxyethyl(meth)acrylate, 2-ethoxyethyl(meth) acrylate, allyloxymethyl(meth)acrylate, 1-ethoxybutyl (meth)acrylate, 1-ethoxyethyl(meth)acrylate, ethoxymethyl (meth)acrylate, poly(ethyleneglycol)methylether(meth) acrylate, poly(propyleneglycol)methylether(meth)acrylate; (vi) caprolactone- and/or valerolactone-modified hydroxyalkyl(meth)acrylate, especially derived from linear, branched or cycloaliphatic diols comprising 2 to 8 carbon atoms; (vii) aminoalkyl(meth)acrylates, especially N,N-dimethylaminoethyl(meth)acrylate, 2-trimethylammoniumethyl(meth)acrylat-chloride and N,N-dimethylaminopropyl (meth)acrylate; (viii) (meth)acrylates of halogenated alcohols, especially perfluoroalkyl(meth)acrylates comprising 6 to 20 atoms; (ix) oxiranyl(meth)acrylate, especially 2,3-epoxybutyl(meth)acrylate, 3,4-epoxybutyl(meth)acrylate and glycidyl(meth)acrylate; (x) styrene and substituted styrenes, especially α-methylstyrenes, 4-methylstyrenes, 4-vinylbenzoic acid and sodium-4-vinylbenzene sulfonate; (xi) (meth)acrylonitrile; (xii) ethylenically unsaturated heterocycles, especially 4-vinylpyridine, vinylimidazole, 1-[2-((meth)acryloyloxy)-ethyl]-2-imidazolidinone, N-vinylpyrolidone and N-vinylcaprolactam; (xiii) phosphoric acid containing ethylenically unsaturated monomers, especially tripropyleneglycol(meth)acrylatephosphate, vinylphosphonic acid and esters thereof, vinylphosphoric acids and esters thereof; (xiv) ethylenically unsaturated sulfonic acids and sulfates and salts thereof, especially potassium[3-((meth) acryloyloxy)propyl]-sulfonate, ammonium[2-((meth)acryloyloxy)ethyl]sulfate; (xv) vinylesters of carboxylic acids comprising 1 to 20 carbon atoms, especially vinylacetate; (xvi) vinylesters of versatic acids; (xvii) maleimides, especially N-phenylmaleimide and N-substituted maleimides comprising linear, branched or cycloaliphatic alkyl groups comprising 1 to 22 carbon atoms, especially N-ethylmaleimide and N-octylmaleimide; (xviii) (meth)acrylamide; (xix) N-alkyl- and N,N-dialkyl-substituted (meth)acrylamides comprising linear, branched or cycloaliphatic alkyl groups comprising 1 to 22 carbon atoms, especially N-(tert-butyl) acrylamide and N,N-dimethylacrylamide; (xx) silyl containing (meth)acrylates, especially (meth)acrylic acid(trimethylsilylester) and (meth)acrylic acid-[3-trimethylsilyl)-propylester]; (xxi) allyl alcohol and polyethers thereof comprising 5 to 80 carbon atoms; (xxii) alkenes, especially 1-hexene, 1-heptene, 1-octene, 1-nonene, 1-decene, 1-undecene and 1-dodecene; and combinations thereof.

According to a preferred embodiment of the present invention, the polymerizable monomer may be an ethylenically unsaturated monomer selected from the group consisting of (meth)acrylic acids and its esters, anhydrides and salts, vinyl acetate, styrenes, (meth)acrylonitrile, maleimides, alkenes and combinations thereof.

In general, according to the present invention, the nanocomposite dispersion resulting from step (c) may comprise the composite particles of inorganic particles and organic polymers in a weight-based concentration from 0.1 to 90% by weight, especially 0.5 to 80% by weight, preferably 1 to 70% by weight, more preferably 5 to 60% by weight, even more preferably 10 to 50% by weight, based on the nanocomposite dispersion.

According to a particular embodiment of the present invention, the composite particles in the nanocomposite dispersion resulting from step (c) may comprise inorganic nanoparticles and organic polymers in a organic polymers/inorganic nanoparticles weight ratio from 99.9:0.1 to 20:80, especially from 99.5:0.5 to 50:50, preferably from 99:1 to 60:40, more preferably from 98.5:1.5 to 80:20, even more preferably from 98:2 to 90:10.

According to a particular embodiment, the composite particles in the nanocomposite dispersion resulting from step (c) may have particle sizes in the range from 1 to 2,500 nm, especially in the range from 2 to 2,000 nm, preferably in the range from 5 to 1,000 nm, more preferably in the range from 10 to 800 nm, even more preferably in the range from 25 to 600 nm.

According to a particular embodiment of the present invention, the composite particles in the nanocomposite dispersion resulting from step (c) have average particle sizes, especially D50 values, in the range from 1 to 1,500 nm, especially in the range from 5 to 1,000 nm, preferably in the range from 10 to 800 nm, more preferably in the range from 20 to 750 nm, even more preferably in the range from 25 to 600 nm.

With respect to the determination methods for determining the aforementioned particles sizes, reference may be made to the above explanations.

According to an optional embodiment of the present invention, step (c) may be followed by a step (d) ("concentration step" or "drying step") where the continuous phase, especially the dispersion medium, of the nanocomposite dispersion resulting from step (c) may be at least partially or even completely removed (especially by drying and/or evaporation methods, especially by lyophilization or freeze drying).

With respect to the continuous phase, especially the dispersion medium, used in the inventive method, such continuous phase may be selected from the group consisting of water, organic solvents and combinations thereof. In the case of organic solvents, these organic solvents may be selected from the group consisting of (i) alcohols, especially straight-chain, branched or cyclic, monohydric or polyhydric alcohols, such as methanol, ethanol, butanol, ethylhexanol, decanol, isotridecyl alcohol, benzyl alcohol, propargyl alcohol, oleyl alcohol, linoleyl alcohol, oxo-process alcohols, neopentyl alcohol, cyclohexanol, fatty alcohols, and diols and polyols, such as glycols, (ii) ether alcohols, such as 2-methoxyethanol, monophenyl diglycol, phenylethanol, ethylene glycol, and propylene glycol, (iii) hydrocarbons, such as toluene, xylene, and aliphatic and/or cycloaliphatic benzine fractions, chlorinated hydrocarbons, such as chloroform and trichloroethane; (iv) ethers, especially cyclic and acyclic ethers, such as dioxane, tetrahydrofuran, and polyalkylene glycol dialkyl ethers, (v) carboxylic esters, especially monocarboxylic esters, such as ethyl acetate and butyl acetate; and dicarboxylic or polycarboxylic esters, such as dialkyl esters of $C_2$ to $C_4$ dicarboxylic acids ("dibasic esters"), (vi) ether esters, especially alkylglycol esters, such as ethylglycol acetate and methoxypropyl acetate, (vii) lactones, such as butyrolactone, (viii) plasticizers, especially phthalates, (ix) aldehydes and ketones, such as methyl isobutyl ketone, cyclohexanone, and acetone; (x) acid amides, such as dimethylformamide, (xi) N-methylpyrrolidone; and combinations thereof. The preferred continuous phase, especially the preferred dispersion medium, is water.

In the different method steps (a), (b) and (c) different or identical continuous phases, especially a different or identical dispersion media, may be used.

According to a particular embodiment of the present invention, the continuous phase, especially the dispersion medium, may be exchanged between steps (a) and (b) and/or between steps (b) and (c). Such exchange of the continuous phase may be performed by removal of the original or previous continuous phase, followed by redispersing the resulting solids in another continuous phase.

According to a second aspect of the present invention, the present invention refers to a nanocomposite dispersion comprising composite particles of inorganic nanoparticles and organic polymers in a continuous phase, especially in a dispersion medium, wherein the nanocomposite dispersion is obtainable by a method as described hereinabove. For further details and embodiments with respect to the inventive nanocomposite dispersion reference can therefore be made to the above explanations and description of the inventive method, which apply in the same manner with respect to the inventive nanocomposite dispersion.

According to a third aspect of the present invention, the present invention also refers to composite particles of inorganic nanoparticles and organic polymers, wherein the composite particles are obtainable from a nanocomposite dispersion of the present invention, especially by removing the continuous phase, i.e. the dispersion medium, and/or by drying methods, respectively. For further details and embodiments with respect to the inventive composite particles of inorganic nanoparticles and organic polymers, reference can therefore be made to the above explanations and description of the other inventive aspects, which apply in the same manner with respect to this inventive aspect.

According to yet another aspect of the present invention (i.e. fourth aspect), the present invention refers to the use of the inventive nanocomposite dispersion or of the inventive composite particles, respectively, in plastics and polymeric compositions, coatings, paints, lacquers and adhesives, especially in applications for wood-based materials or substrates. For further details and embodiments with respect to this inventive aspect, reference can therefore be made to the above explanations and description of the other inventive aspects, which apply in the same manner with respect to this inventive aspect.

Further, according to yet another aspect of the present invention (i.e. fifth aspect), the present invention relates to plastics and polymeric compositions, coatings, paints, lacquers and adhesives, comprising a nanocomposite dispersion of the present invention or composite particles of the present invention, respectively, especially in applications for wood-based materials or substrates. For further details and embodiments with respect to this inventive aspect, reference can therefore be made to the above explanations and description of the other inventive aspects, which apply in the same manner with respect to this inventive aspect.

Finally, according to a last aspect of the present invention (i.e. sixth aspect), there is provided an additive composition, especially for use in plastics and polymeric compositions, coatings, paints, lacquers and adhesives, wherein the additive composition comprises a nanocomposite dispersion of the present invention or composite particles of the present invention, respectively. For further details and embodiments with respect to this inventive aspect, reference can therefore be made to the above explanations and description of the other inventive aspects, which apply in the same manner with respect to this inventive aspect.

Further embodiments, modifications and variations of the present invention can readily be recognized and implemented by the skilled practitioner when reading the description, without leaving the scope of the present invention.

The present invention is illustrated, in the following, with reference to operative examples, which, however, shall not restrict or limit the present invention in any way.

EXAMPLES

1. Preparation of Nanoparticles (Method Step (a))
(a) General Production Methods for Nanoparticles
Synthesis of Nanoparticles:

There are many ways in which such nanoparticles (e.g. metal oxides, doped metal oxides etc.) can be prepared. These methods include:

(i) High-Energy Mechanical Milling

High-energy mechanical milling processes involve the comminution of bulk materials, typically using a ball mill. The principle of comminution is applying physical forces to bulk material so as to break it into smaller sizes. The forces required to effect breakage are usually a combination of either impact or shear forces.

(ii) Mechanochemical Processing (MCP)

In the mechanochemical process (MCP), two or more reacting materials are introduced into the milling chamber and are simultaneously milled to produce a nanoscale composite that can be further processed into dispersed nanopowders by removing the matrix phase.

(iii) Precipitation and Co-Precipitation Methods

This process of producing metal oxide nanoparticles is normally based on the addition of alkaline materials to metal salts, which leads to precipitation. Co-precipitation process is used to synthesize doped metal oxides, where precipitating agents are added to mixed metal salts solution rather than a single metal salt solution.

(iv) Homogeneous Precipitation Methods

In the homogeneous precipitation process, the precipitating agents are generated "in situ" simultaneously and uniformly throughout the solution. A homogeneous precipitation process gives a better control of chemical and morphological characteristics than those of normal precipitation processes.

(v) Sol-Gel Method

The sol-gel process can be defined as the hydrolysis and condensation of a liquid precursor to a solid. In simple terms, sol-gel processing involves the transition from a sol (very finely divided solid particles dispersed in a liquid which will not settle out) to a gel (a dispersion of a liquid throughout a solid matrix). Sol-gel methods include aqueous sol-gel methods and non-aqueous sol-gel methods.

In general, the sol-gel process consists of the following steps:
(1) preparation of a homogeneous solution either by dissolution of metal organic precursors in an organic solvent that is miscible with water, or by dissolution of inorganic salts in water;
(2) conversion of the homogeneous solution into a sol by treatment with a suitable reagent (generally water with or without any acid/base);
(3) ageing;
(4) shaping; and
(5) thermal treatment/sintering/calcination.

(vi) Hydrothermal and Solvothermal Methods

Hydrothermal/Solvothermal processes refer to chemical reactions that are performed in a closed reaction vessel (or system) at temperatures higher than the boiling point of the water/solvent system employed.

(vii) Physical Vapor Deposition (PVD)

In the PVD process, arc energy is first applied to a solid precursor in order to generate a vapor at high temperature. A reactant gas is then added to the vapor, which is then cooled at a controlled rate and condenses to form nanoparticles.

(viii) Chemical Vapor Deposition (CVD)

In chemical vapor deposition (CVD) processes, a precursor is converted to the gas phase and then undergoes decomposition at either low or atmospheric pressure to generate the nanostructured particles. These particles are then transported out of the reaction zone by a carrier gas and collected on a cold substrate. Depending on the material and reaction conditions, amorphous, polycrystalline or single-crystalline powders can be prepared.

(ix) Flame Pyrolysis

During pyrolysis, chemical precursors decompose into a solid compound under proper thermal conditions, while unwanted waste products evaporate. Frequently used precursors are metal carbonates, oxalates, carbonyls, nitrates, citrates, and alkoxides.

Dopants may be incorporated into the particles principally by one of the following:

(i) Doping within the particle during formation, e.g. by co-precipitation, or in hydrothermal processes.

(ii) Absorption of dopant ions onto the surface followed by firing of the dopant ion into the material.

(iii) A combustion synthesis. Doping during formation can be achieved by a combustion process whereby a mixture of salts of the dominant metal and the dopant metal is heated together with, for example, glycine or other combustible solvents, preferably oxygen-containing ones, such as aliphatic alcohols, for example C1-C6 alcohols, in particular isopropyl alcohol, in a flame to convert it to the oxide.

(iv) A mechanochemical process typically involving milling, generally using a ball mill.

(v) A double decomposition process whereby, for example, a salt of dominant metal and of the dopant, such as nitrate or chloride, is reacted with a soluble oxide or hydroxide, for example of magnesium or calcium, and the resulting oxide or hydroxide is recovered and the water soluble removed, typically by washing. In the case of the hydroxide, this is calcined to convert it to the desired doped oxide.

Particle Size:

As an option, the particles have an average size in the range of 0.5 to 1,000 nm. As an option, the particles may have an average size in the range of 5 to 500 nm. As a further option, the particles may have an average size in the range of 5 to 100 nm.

As an option, the dopant is present in the range of 0.5 to 80 mole %. As an option, the dopant is present in the range of 5 to 60 mole %. As an option, the dopant is present in the range of 0.5 to 60 mole %. As a further option, the other metal oxide is present in the range of 10 to 40 mole %.

While there are many ways to prepare suitable particles, the following is provided by way of example only.

(b) Specific Production Methods for Nanoparticles

Example 1

Preparation of $CeO_2$ Nanoparticles 0.01 mole of $Ce(NO_3)_3 \cdot 6H_2O$ was dissolved in 200 ml of deionized water and stirred for 30 minutes. While stirring, aqueous ammonia solution was added slowly to the solution until pH 9 was reached. A gel-like precipitate was formed and the mixture was stirred for further 60 minutes. The resulting precipitate was separated and washed with deionized water three times. The resulting precipitate was then dried at room temperature for 24 hours and subsequently dried at 110° C. for 5 hours to obtain $CeO_2$ nanoparticles.

Example 2

Preparation of $CeO_2$ Nanoparticles 0.01 mole of $Ce(NO_3)_3.6H_2O$ was dissolved in 200 ml of deionized water and stirred for 30 minutes. While stirring, aqueous ammonia solution was added slowly to the solution until pH 9 was reached. A gel-like precipitate was formed and the mixture was stirred for further 60 minutes. The resulting precipitate was separated and washed with deionized water three times. The resulting precipitate was freeze-dried (lyophilized) in a vacuum to obtain $CeO_2$ nanoparticles.

Example 3

Preparation of Iron-Doped $CeO_2$ Nanoparticles 0.008 mole of $Ce(NO_3)_3.6H_2O$ and 0.002 mole of $FeCl_3.6H_2O$ were dissolved in 200 ml of deionized water and stirred for 30 minutes. While stirring, aqueous ammonia solution was slowly added to the solution until a pH of 9.0 was reached. A gel-like precipitate was formed and the mixture was stirred for a further 60 minutes. The resulting precipitate was separated and washed with deionized water three times. The precipitate was then dried at room temperature for 24 hours and further dried at 110° C. for 5 hours to obtain $Ce_{0.8}Fe_{0.2}O_2$ nanoparticles.

Example 4

Preparation of Iron-Doped $Ce_{0.8}Fe_{0.2}O_2$ Nanoparticles 0.008 mole of $Ce(NO_3)_3.6H_2O$ and 0.002 mole of $FeCl_3.6H_2O$ were dissolved in 200 ml of deionized water and stirred for 30 minutes. While stirring, aqueous ammonia solution was slowly added to the solution until the pH reached 9.0. A gel-like precipitate was formed and the mixture was stirred for a further 60 minutes. The resulting precipitate was separated and washed with deionized water three times. The precipitate was then freeze dried in a vacuum to form $Ce_{0.8}Fe_{0.2}O_2$ nanoparticles.

Example 5

Preparation of Iron-Doped $Ce_{0.9}Fe_{0.1}O_2$ Nanoparticles 0.009 mole of $Ce(NO_3)_3.6H_2O$, 0.001 mole of $FeCl_3.4H_2O$ and 0.06 mole of urea were dissolved in 200 ml of deionized water and stirred for 30 minutes. The solution was heated to a temperature of between 85 and 90° C. for 5 hours to form a precipitate. The resulting precipitate was separated and washed with deionized water three times. The precipitate was dried at room temperature for 24 hours and then further dried at 110° C. for 5 hours to obtain $Ce_{0.9}Fe_{0.1}O_2$ nanoparticles.

Example 6

Preparation of Iron-Doped $Ce_{0.9}Fe_{0.1}O_2$ Nanoparticles 0.009 mole of $Ce(NO_3)_3.6H_2O$, 0.001 mole of $FeCl_3.4H_2O$ and 0.06 mole of urea were dissolved in 200 ml of deionized water and stirred for 30 minutes. The solution was heated to a temperature of between 85 and 90° C. for 5 hours to form a precipitate. The resulting precipitate was separated and washed with deionized water three times. The precipitate was then freeze dried in a vacuum to obtain $Ce_{0.9}Fe_{0.1}O_2$ nanoparticles.

Example 7

Preparation of Silica Nanoparticles

Silica can be provided in different forms, for example as solid material or as aqueous silica dispersions known in the art. Suitable forms of silica may be solid and/or dispersed forms of silica sol, silica gel, pyrogenic silicas, precipitated silicas or mixtures thereof.

Preferably, the particle diameter of the silica particles ranges from 1 to 200 nm, preferably from 2 to 100 nm, most preferably from 3 to 50 nm, as measured by the specific BET-surface method of G. N. Sears, Analytical Chemistry, Vol. 28, No. 12, 1981-1983, December 1956, wherein 1 to 200 nm correlates to a specific surface area of the particles of 15 to 2,000 $m^2/g$. Preferably, the surface of the $SiO_2$ particles has an anionic charge which is balanced by an appropriate counter-ion so as to provide a stable colloidal solution. Preferably, the alkaline-stabilized silica sols have a pH value of 7 to 11.5, preferably containing an alkalizing agent, for instance small amounts of $Na_2O$, $K_2O$, $Li_2O$, ammonia, organic nitrogen bases, tetraalkylammonium hydroxides or alkali or ammonium aluminates. Preferably, silica sols can also be present in weakly acidic form as semi-stable colloidal solutions. Preferably, cationic silica particles can be provided by coating the silica surface with $Al_2(OH)_5Cl$. Preferably, the solids content of the silica dispersions, in particular colloidal silica dispersions, such as stable colloidal silica dispersions, ranges from 4 to 60% by weight, for example 5 to 30% by weight, of $SiO_2$.

According to one embodiment, the preparative process for silica sols in essence passes through the production steps of de-alkalinization of water glass by means of ion-exchange, adjusting and stabilizing the particle size (distribution) desired in each case of the $SiO_2$ particles, adjusting of the $SiO_2$ concentration desired in each case, and, optionally, a surface modification of the $SiO_2$ particles, such as for instance with $Al_2(OH)_5Cl$. In none of these steps do the $SiO_2$ particles leave the colloidally dissolved state.

Further details on the synthesis and characteristics of silicas in the solid form can be derived, for instance, from K. H. Michel, H.-H. Moretto, P. Woditsch, Industrielle Anorganische Chemie, Wiley VCH Verlag 1999, Chapter 5.8.

If silica ($SiO_2$) raw material in solid form is used such as for example pyrogenic or precipitated silica, such forms can be conveyed to an aqueous silica ($SiO_2$) dispersion. For the preparation of silica dispersions, use can be made of state of the art dispergators, preferably those which are suitable to obtain high rates of shear, such as e.g. Ultra-Turrax® or dissolver discs.

Preferably, silica dispersions are used wherein the $SiO_2$ particles are present as discrete uncrosslinked primary particles.

Silica may also be as described in, for example, WO 2011/054774 A1, in particular with respect to embodiments describing the modification of silica particles with silane compounds so as to form silane-modified silica. Silane and silica particles can preferably be mixed at a temperature from about 20 to about 95° C., most preferably from about 60 to about 70° C. Preferably, silane is slowly added to the silica particles under vigorous agitation at a temperature of about 60° C. and at a controlled rate. Preferably, colloidal silica particles and silane are mixed in a weight ratio of silane to silica of from about 0.01 to about 1.5, more preferably from about 0.05 to about 1, and most preferably from about 0.10 to about 0.5. Further details on silane-modified silica including suitable silane compounds for modification can be found in WO 2011/054774 A1. Silica, in particular colloidal silica particles, may also be modified and can contain other elements such as aluminum, nitrogen, zirconium, gallium, titanium and/or boron, which can be present in the particles and/or the continuous phase. Boron-modified silica sols are described in e.g. U.S. Pat. No. 2,630,410 A. The procedure of preparing an aluminum modified silica sol is further described in e.g. The Chemistry of Silica, by Iler, K. Ralph, pages 407-409, John Wiley & Sons (1979) and in U.S. Pat. No. 5,368,833 A.

Example 8

Preparation of Nanoclay Particles

Nanoclay particles may also be produced according to methods known in the art and are commercially available, especially from Laviosa Chimica Mineraria S.p.A., Italy, e.g. the commercial DELLITE® product series (DELLITE® 43B, DELLITE® LVF etc.), or from Rockwood Company Group, especially from Southern Clay Products, Inc., United States of America, especially the commercial Cloisite® product series (e.g. Cloisite® Nat, a natural montmorillonite).

Example 9

Preparation of Nanoparticles of $TiO_2$, ZnO or $Al_2O_3$

Nanoparticles of $TiO_2$, ZnO or $Al_2O_3$ can also be prepared according to conventional methods known in the art and are also commercially available.

Example 10

Preparation of Further Ceria Nanoparticles

Production of hydrophobically modified $CeO_2$ nanoparticles dispersible in non-polar organic solvents by milling technique for hybrid binder incorporation:
Production of $CeO_2$ Cake by Precipitation Method:
In this process, hydrophilic $CeO_2$ was used as starting material. $CeO_2$ should be as a cake after synthesis, and it will not be necessary to wash this cake to remove containing salts. This cake contains approximately 20 to 25% by weight $CeO_2$. It is also possible to extend this process to production of other metal oxide or metal nanoparticle cake by chemical precipitation method.
Hydrophobic Surface Modification and Production of $CeO_2$ Nanoparticle Hexane Dispersion:
The cake was dried in an oven at 60° C. for 24 hours. The cake was crushed in a mortar to convert big agglomerates into a fine powder.
Weight Up:
$CeO_2$ dry powder (80% by weight by TGA): 1.2 g
Fe balls (diameter: 9 mm): 400.0 g
This mixture was milled at 300 rpm for 2 hours. The aforementioned iron balls were used for the milling. Use of even smaller iron balls (0.5 to 9 mm in diameter) will allow to crush $CeO_2$ aggregates to much smaller particles in nanosize.

Sodium oleate powder (1.06 g) was added and the whole was milled for 3 hours at 300 rpm (wherein the $CeO_2$: sodium oleate ratio was optimized during the experiments using TGA to determine free oleates concentration in the samples). The mill was stopped and the milled product was taken out. The iron balls were separated from the product with the help of a sieve. 50 ml of n-hexane were added to the powder. A portion of this hexane was used to rinse the balls and the mill. The product mixed with hexane was transferred to a beaker and covered with a Petri dish. The mixture was stirred with a magnetic stirring bar for 30 minutes to extract hydrophobic $CeO_2$. The suspension was subjected to centrifugation at 2,800 rpm for 10 minutes; the supernatant was separated from the sediment. The supernatant was completely transparent and had a dark yellow color. An undissolved part of the sediment in hexane was dried and reused for modification. After several hours, the supernatant could get some sediment; in this case, another treatment by centrifugation will be necessary. The concentration of $CeO_2$ was measured using TGA.

It is also possible to use the same milling technique to modify the surface of hydrophilic metal oxide and metal nanoparticles into hydrophobic ones. Instead of using ceria cake produced by precipitation method, commercially available dry nanopowders of ceria (other metal oxides, metals etc.) produced by precipitation, plasma, flame, hydrothermal, solvothermal or sol-gel method etc. can also be used as starting materials instead of hydrophilic ceria (metal oxide or metal nanopowders etc).

It is also possible to use smaller Fe balls or other types of milling media except Fe. One criterion is that the milling media has to have a low solubility or no solubility in the solvent of interest for easy separation of the hydrophobized nanoparticles. Solvent in above example was n-hexane.

Any other milling techniques, such as ball milling, bead milling, attrition milling, 2-roll mills, 3-roll mills etc., can be used in general.

In this case, hexane is used as a solvent of interest to disperse ceria nanoparticles. But in principle other organic solvents can be used. The chosen solvent should be substantially hydrophobic in nature in order not to solubilize the hydrophilic water soluble components in the mill.

Surface modifier can be selected from a large group of R—COOM systems (wherein R can be aliphatic or aromatic; M can be H, Na, K or $NH_4$ or other cations). Carboxylic acid and carboxylic acid salts or polycarboxylates are also possible.

Transfer of hydrophobic $CeO_2$ from hexane into Isopar® L (isoparaffinic fluid), i.e. change of solvent:

$CeO_2$ was mixed in n-hexane suspension (previously concentrated by evaporation), i.e. with the amount of Isopar® L that is calculated to get $CeO_2$ suspension with a concentration of about 10% by weight. This mixture was poured into a round flask which was connected to a rotating evaporator. The water bath temperature was set at 70° C. The vacuum pump was started. The evaporator was started and the hexane was evaporated of the mixture until no further liquid condensed anymore. The mixture contained in the flask had only Isopar® L as solvent. The suspension was taken out and analyzed. A UV-VIS spectrum (Lambda® 650) was measured, the concentration was determined by TGA (Pyris®) and particle size was determined by light scattering (Nanosizer® ZS).

Although a rotary evaporator was used in this example to evaporate hexane from the mixture of solvents, it is also possible to use other solvent exchange methods. It might be possible to separate solvents based on their solubility differences or density differences by simple liquid separation techniques or based on poor solvent principle to precipitate nanoparticles out and redisperse them in a desired organic solvent.

According to another embodiment, the following production process was applied. Aggregates of ceria nanoparticles were produced by precipitation method. A certain amount of $Ce(NO_3)_2 \cdot 6H_2O$ salts was dissolved in distilled water and heated to a certain temperature. Then, at certain temperatures (larger than 40° C.) cerium ions precipitated by adjusting pH of the solution to 6-11 with a common inorganic bases (for example, $NH_3H_2O$ or NaOH) under strong mechanical stirring condition in an open reaction vessel. The resultant yellowish precipitate was collected by centrifugation and dried in an oven at 60° C. for 24 h to remove excessive water. Then, obtained yellowish dry powder was crushed in a mortar to convert big agglomerates into a fine powders. TGA results showed that dry powder contains 80% by weight ceria. The fine powders were subjected to powder XRD and formation of aggregated ceria nanoparticle was confirmed by powder XRD analysis.

2. Surface-Modification of Nanoparticles (Method Step (b))

(a) General Surface Modification Methods

In order to make the nanoparticles produced according to the previous examples compatible with the polymerizable monomers used in method step (c), their surface needs to be coated and modified for the encapsulation into the polymeric latex droplets. The surface modifying agent may generally have a long hydrophobic chain with a head group anchored to the nanoparticles. According to the present invention, an at least double or at least two-stage surface modification is applied in order to render the nanoparticles particularly compatible with the polymerizable monomers.

Dispersion

In principle, the dispersions of nanoparticles used according to the invention may be formed on an aqueous or organic basis and/or comprise water or organic solvents as dispersion medium.

In addition, however, there also exists in principle the possibility for the dispersions of nanoparticles of the invention to be formed in organic monomers and/or to comprise at least one organic monomer as dispersion medium.

In addition, the dispersions of nanoparticles according to the present invention may further comprise at least one further ingredient and/or at least one additive, which may be in particular selected from the group of emulsifiers, wetting agents, antioxidants, stabilizers, neutralizing agents, thickeners, dispersants, organic solvents, solubilizers and biocides as well as also mixtures thereof.

With regard to the concept of the dispersion, as it is used in the context of the present invention, reference may be made in particular to DIN 53900 of July 1972, according to which the concept of the dispersion is a designation for a system (i.e., disperse system) of two or more phases, one phase of which is continuous (namely the dispersion medium) and at least one further phase of which is finely divided (namely the dispersed phase or the dispersoid, i.e. in this case the nanoparticles). In the context of the present invention, the concept of the dispersion is designated exclusively in relation to the designation of suspensions, i.e. dispersions of insoluble particulate solids in liquids.

Dispersing Process

The present invention provides a method of dispersing nanoparticles in a continuous phase, especially in at least one dispersion medium, i.e. a method of preparing dispersions of nanoparticles in a continuous phase, especially in at least one dispersion medium selected from water, organic monomers and/or organic solvents or combinations thereof, the nanoparticles being dispersed in a continuous phase, especially in at least one dispersion medium, in the presence of at least one dispersant (i.e. dispersing agent), with introduction of an energy input sufficient for dispersing.

Typically, the dispersing operation proper is preceded by a method step in which the nanoparticles for subsequent dispersion are contacted with the continuous phase, especially with the dispersion medium, and with the dispersant (i.e. dispersing agent) and also, where appropriate, with optional further constituents or ingredients of the dispersion, and these components are homogenized with one another, especially with corresponding input of energy, preferably with stirring. The energy input required for this purpose, however, is smaller than for the dispersing operation as such, and so a customary stirring or mixing operation is sufficient for this purpose.

The dispersion of nanoparticles into water, organic solvents and/or organic monomers or combinations thereof may take place, for example, by introduction of the necessary energy, in particular by simple, e.g., low-shear-force stirring or mixing, but also, in particular, by using dissolvers, Dispermats®, bead mills and ball mills, high-pressure nozzles, rotor-stator-systems, 2-roll mills, 3-roll mills, ultrasound etc., with additional use of dispersing agents, as described above.

The dispersing operation takes place with sufficient input of energy (e.g. input of shearing energy): On the one hand, the energy introduced must be sufficient to provide the energy needed for dispersing, especially to disrupt the agglomerates, conglomerates, coils etc., formed by the nanoparticles, but on the other hand, it must not exceed a certain level above which destruction of the nanoparticles begins or other side-effects start—and this must be the case in the presence of a suitable dispersant (i.e. dispersing agent), which is capable of stabilizing the individual nanoparticles and of preventing reagglomeration occurring again and also of facilitating the subsequent dispersing and in that way stabilizing the resultant dispersions.

As outlined above, it is necessary, in order to carry out the dispersing operation, for there to be a sufficient input of energy into the dispersion medium, which on the one hand must be sufficient to ensure reliable dispersing of the nanoparticles, and on the other hand must not be so high that there is destruction of the nanoparticles or of their structures and morphologies.

The provision of the required energy input is accomplished by means of using dissolvers, Dispermats®, bead mills and ball mills, high-pressure nozzles, rotor-stator-systems, 2-roll mills, 3-roll mills, ultrasound etc.

In general, the amount of energy introduced can vary within wide ranges, depending on the composition, structure and state of agglomeration of the nanoparticles. In particular, the amount of energy introduced, calculated as energy introduced per unit quantity of nanoparticles to be dispersed, is e.g. 50 to 500,000 kJ/kg, especially 100 to 250,000 kJ/kg, preferably 150 to 100,000 kJ/kg, more preferably 200 to 50,000 kJ/kg, most preferably 250 to 25,000 kJ/kg. Nevertheless, relative to the application or as a result of a specific case, it may be necessary to deviate from the aforementioned figures, without departing the scope of the present invention.

In general, the dispersion process is carried out at temperatures below the boiling temperature of the continuous phase, especially of the dispersion medium. Preferably, the method of the invention is carried out at temperatures in the range from 5 to 150° C., preferably 10 to 100° C., most preferably 15 to 80° C. In this case, it may, where appropriate, be necessary to carry out the dispersing operation with cooling, since the energy input results in an increase in the temperature of the resultant dispersion.

With the dispersing method, it is possible to obtain relatively high concentrations of nanoparticles in the resultant dispersions. In particular, the method of the invention can be used to prepare dispersions having solids contents, in terms of nanoparticles, of up to 60% by weight or more, based on the resulting dispersions. In general, the nanoparticles are dispersed in amounts from 0.001 to 60% by weight, in particular 0.01 to 55% by weight, preferably 0.1 to 50% by weight, more preferably 0.5 to 45% by weight, even more preferably 1 to 40% by weight, based on the resulting dispersions, in the continuous phase.

Dispersants/Wetting and Dispersing Additives

The concept of the dispersant—also designated, synonymously, as dispersing agent, dispersing additive, wetting agent etc. —as used in the context of the present invention designates, generally, substances which facilitate the dispersing of nanoparticles in a dispersion medium, especially by lowering the interfacial tension between the two components (i.e. nanoparticles to be dispersed, on the one hand, and dispersant, on the other hand) and so by inducing wetting. Consequently, there are a multiplicity of synonymous designations for dispersants (i.e. dispersing agents) in use, with examples being dispersing additives, antisettling agents, wetting agents, detergents, suspending or dispersing assistants, emulsifiers etc. The concept of the dispersant should not be confused with the concept of the dispersion medium, the latter designating the continuous phase of the dispersion (i.e. the liquid, continuous dispersion medium). In the context of the present invention, the dispersant, additionally, serves the purpose of stabilizing the dispersed nanoparticles as well, i.e. of holding them stably in dispersion, and of avoiding or at least minimizing their reagglomeration in an efficient way; this in turn leads to the desired viscosities of the resulting dispersions, since, in this way, readily manageable, fluid systems result in practice—even in the case of high concentrations of the dispersed nanoparticles. Without the use of the dispersant, in contrast, there would be such an increase in the viscosity of the resulting dispersions, as a result of unwanted reagglomeration of the dispersed nanoparticles that—at least at relatively high nanoparticle concentrations—there would in practice no longer be manageable systems resulting, since those systems would have too high a viscosity or too low a fluidity.

For further details relating to the terms "dispersoid", "dispersing", "dispersant", "disperse systems", and "dispersion", reference may be made, for example, to Römpp Chemielexikon, 10th Edition, Georg Thieme Verlag, Stuttgart/New York, Volume 2, 1997, pages 1014/1015, and also to the literature referred to therein, the entire disclosure contents of which are hereby incorporated by reference.

As far as the inventively used dispersant is concerned, it is more particularly a polymeric dispersant, especially a polymeric dispersant based on a functional polymer, preferably having a number-average molecular mass of at least 500 g/mol, preferably at least 1,000 g/mol, more preferably at least 2,000 g/mol. In particular, the inventively used dispersant may be selected from the group of polymers and copolymers having functional groups and/or groups with pigment affinity, alkylammonium salts of polymers and copolymers, polymers and copolymers having acidic groups, comb copolymers and block copolymers, such as block copolymers having groups with pigment affinity, especially basic groups with pigment affinity, optionally modified acrylate block copolymers, optionally modified polyurethanes, optionally modified and/or salified polyamines, phosphoric esters, ethoxylates, polymers and copolymers having fatty acid radicals, optionally modified polyacrylates, such as transesterified polyacrylates, optionally modified polyesters, such as acid-functional polyesters, polyphosphates, and mixtures thereof.

Furthermore, it is possible in principle, as dispersants suitable in accordance with the invention, to use all of the dispersants, surfactants, wetting agents etc. which are known for that purpose.

In an inventively preferred way the compounds selected as dispersants are especially those compounds of the kind described in publications EP 1 593 700 B1, EP 0 154 678 B1, EP 0318 999 B1, EP 0270 126 B1, EP 0 893 155 B1, EP 0 417 490 B1, EP 1 081 169 B1, EP 1 650 246 A1, EP 1 486 524 A1, EP 1 640 389 A1, EP 0 879 860 B1, WO 2005/097872 A1 and EP 1 416 019 A1, the respective disclosure contents of which are hereby incorporated in full by reference.

Dispersion Media

In an inventively preferred way the dispersion medium used as the continuous phase is a dispersion medium which is selected from the group of water, organic monomers or oligomers and/or organic solvents or combinations thereof.

Organic solvents are selected from the groups of (i) alcohols, especially straight-chain, branched or cyclic, monohydric or polyhydric alcohols, such as methanol, ethanol, butanol, ethylhexanol, decanol, isotridecyl alcohol, benzyl alcohol, propargyl alcohol, oleyl alcohol, linoleyl alcohol, oxo-process alcohols, neopentyl alcohol, cyclohexanol, fatty alcohols, and diols and polyols, such as glycols; (ii) ether alcohols, such as 2-methoxyethanol, monophenyl diglycol, phenylethanol, ethylene glycol, and propylene glycol; (iii) hydrocarbons, such as toluene, xylene, and aliphatic and/or cycloaliphatic benzine fractions, chlorinated hydrocarbons, such as chloroform and trichloroethane; (iv) ethers, especially cyclic and acyclic ethers, such as dioxane, tetrahydrofuran, polyalkylene glycol dialkyl ethers and polyalkylene glykols and polyalkylene glycol ethers (e.g. alpha,omega-hydroxy functional or dialkyl ethers); (v) carboxylic esters, especially monocarboxylic esters, such as ethyl acetate and butyl acetate; and dicarboxylic or polycarboxylic esters, such as dialkyl esters of $C_2$ to $C_4$ dicarboxylic acids ("dibasic esters"); (vi) ether esters, especially alkylglycol esters, such as ethylglycol acetate and methoxypropyl acetate; (vii) lactones, such as butyrolactone; (viii) plasticizers, especially phthalates; (ix) aldehydes and ketones, such as methyl isobutyl ketone, cyclohexanone, and acetone; (x) acid amides, such as dimethylformamide; (xi) N-methylpyrrolidone; and also mixtures of the aforementioned dispersion media. Furthermore, it is also possible in principle to employ ionic liquids or what are known as supercritical fluids as a dispersion medium. Water as well is a suitable dispersion medium in the context of the present invention.

(b) Specific Surface Modification Methods for Nanoparticles

Example 11

Surface Modification of $CeO_2$ Nanoparticles
(Comparative)

In 166.67 g of water, 33.33 g of commercially available Disperbyk®-190 (BYK-Chemie GmbH, Wesel, Germany), a solution of a polymeric wetting and dispersing additive with groups having pigment affinity, are mixed in. Added to this mixture with stirring are 50 g of a cerium oxide nanopowder according to the previous Examples (e.g. Example 1). This mixture is then dispersed, following addition of 80 g of glass beads (diameter 1 mm), by means of a Dispermat® at approximately 2,000 rpm for 6 hours at 40° C. The glass pearls are then removed by sieving and the dispersion thus obtained is ready. The water-based dispersion of surface treated ceria is low viscous and shows no sedimentation after two weeks of storage at ambient conditions.

Example 12

Surface Modification of $CeO_2$ Nanoparticles

In 166.67 g of water, 33.33 g of Disperbyk®-190, a solution of a polymeric wetting and dispersing additive with groups having pigment affinity, are mixed in. Added to this mixture with stirring are 50 g of a cerium oxide nanopowder according to the previous Examples (e.g. Example 1). This mixture is then dispersed, following addition of 80 g of glass beads (diameter 1 mm), by means of a Dispermat® at approximately 2,000 rpm for 1 hour at 30° C. Following this 0.5 g of a reactive organofunctional silane (Dynasylan® AMEO from Evonik Industries AG, Essen, Germany, i.e. a 3-aminopropyltriethoxysilane) are added while maintaining the dispersing process for another 5 hours. The glass pearls are then removed by sieving and the dispersion thus obtained is ready. The water based dispersion of surface treated ceria is low viscous and shows no sedimentation after two months storage at ambient conditions.

Example 13

Surface Modification of $SiO_2$ Nanoparticles

In 160 g of an aromatic free mineral spirit (Exxsol® D60), 11.25 g of a polymeric wetting and dispersing additive with groups having pigment affinity, e.g. carboxylic acid salts of unsaturated polyamineamides or other copolymers with pigment affinic groups, (e.g. commercially available dispersing agents from BYK-Chemie GmbH, Germany, such as e.g. AntiTerra®-U etc.) are dissolved. Added to this mixture with stirring are 75 g of a commercial $SiO_2$ nanopowder (Nano-Silica 999, Elkem A S, Norway) having a particle size <400 nm (primary particle size <100 nm). After adding 4.1 g of a reactive organofunctional silane (Dynasylan® VTMO from Evonik Industries AG, Essen, Germany, i.e. a vinyltrimethoxysilane) to this mixture and addition of 400 g of glass beads (diameter 2 mm) the mixture is dispersed by means of a Dispermat® at approximately 2,000 rpm for 4 hours at 30° C. The glass pearls are then removed by sieving and the dispersion is ready. The dispersion obtained is stable for a number of months with only minor settling of some silica.

Example 14

Surface Modification of Clay Nanoparticles

In 117.5 g of aromatic free mineral spirit (Exxsol® D60), 1 g of a polymeric wetting and dispersing additive with groups having pigment affinity, e.g. carboxylic acid salts of unsaturated polyamineamides or other copolymers with pigment affinic groups, (e.g. commercially available dispersing agents from BYK-Chemie GmbH, Germany, such as e.g. Anti-Terra®-U etc.) are dissolved. Added to this mixture with stirring are 6.25 g of a commercial surface-treated clay nanopowder DELLITE® 43B from Laviosa Chimica Mineraria S.p.A., Italy, having a primary platelet size of averaged 1 nm-600 nm. Then 0.34 g of Dynasylan® VTMO are added subsequently. This mixture is then dispersed, following addition of 200 g of glass beads (diameter 2 mm), by means of a Dispermat® at approximately 2,000 rpm for 4 hours at 30° C. The glass pearls are then removed by sieving and the dispersion is ready. The dispersion obtained is stable for a number of months at ambient conditions without any settling of clay particles.

Example 15

Surface Modification of $CeO_2$ Nanoparticles
(Comparative)

40 g of $CeO_2$ nanoparticles produced according to the previous Examples (e.g. Example 2), 24 g of Lutensol® XP 30 (BASF SE, Germany) and 336 g Isopar® L were introduced in a bead mill and milled for 2 hours. The bead size was 1 mm in diameter, the bead volume was 100 ml, rotation speed was 400 rpm and the pump power was 50%. After milling the resulting mixture was filtered to obtain the $CeO_2$ nanoparticle dispersion.

Example 16

Surface Modification of $CeO_2$ Nanoparticles
(Comparative)

40 g of $CeO_2$ nanoparticles produced according to the previous Examples (e.g. Example 2), 24 g of Solsperse® 3000 (Lubrizol, Ltd., Great Britain) and 336 g Isopar® L were introduced in a bead mill and milled for 2 hours. The bead size was 1 mm in diameter, the bead volume was 100 ml, rotation speed was 400 rpm and the pump power was 50%. After milling the resulting mixture was filtered to obtain the $CeO_2$ nanoparticle dispersion.

Example 17

Surface Modification of $Ce_{0.8}Fe_{0.2}O_2$ Nanoparticles
(Comparative)

40 g of the $Ce_{0.8}Fe_{0.2}O_2$ nanoparticles produced according to the previous Examples (e.g. Example 3), 24 g Lutensol® 30 and 336 g Isopar® L were introduced in bead mill and milled for 2 hours. The bead size was 1 mm in diameter, rotation speed was 400 rpm and the pump power was 50%. After milling the resulting mixture was filtered to obtain the $Ce_{0.8}Fe_{0.2}O_2$ nanoparticle dispersion.

Example 18

Surface Modification of $CeO_2$ Nanoparticles 166.67 g of water and 33.33 g Disperbyk®-190 as polymeric wetting and dispersing additive with groups having pigment affinity (amine value=52 mg KOH/g and acid value=58 mg KOH/g) are mixed. 50 g of $CeO_2$ nanoparticles produced according to the previous Examples (e.g. Example 1) are introduced into the mixture. The mixture is then dispersed, following by the addition of 80 g of glass beads with a diameter of 1 mm, by means of a Dispermat® at approximately 2,000 rpm for 1 hour at 30° C. Afterwards, 0.5 g of reactive silanes (see above) are added while maintaining the dispersing process for another 5 hours. The glass pearls are then removed by sieving and the dispersion thus obtained is ready. The water-based dispersion of surface-treated ceria is low viscous and shows no sedimentation after two months storage at ambient conditions.

Example 19

Surface Modification of ZnO Nanoparticles

In 174 g of water, 6 g of a polymeric wetting and dispersing additive with groups having pigment affinity (see above) are mixed in. Added to this mixture with stirring are 120 g of a commercial zinc oxide nanopowder having a primary particle size of D50 of 40 nm. This mixture is then dispersed, following addition of 250 ml of glass beads (diameter 1 mm), by means of a Dispermat® at approximately 2,000 rpm for 3 hours. Afterwards, reactive silanes (see above) are added while maintaining the dispersing process for another 5 hours. The glass pearls are then removed by sieving and the dispersion thus obtained is ready. The resulting dispersion of surface-treated ZnO is low viscous and shows no sedimentation after several months storage at ambient conditions.

Example 20

Surface Modification of ZnO Nanoparticles

In 262 g of nonpolar solvent (Exxsol® D60), 18 g of a polymeric wetting and dispersing additive with groups having pigment affinity (see above) are dissolved. Added to this mixture with stirring are 120 g of a commercial ZnO nanopowder having a primary particle size of D50 of 40 nm. This mixture is then dispersed, following addition of 250 ml of glass beads (diameter 1 mm), by means of a Dispermat® at approximately 2,000 rpm for 3 hours. Afterwards, reactive silanes (see above) are added while maintaining the dispersing process for another 5 hours. The glass pearls are then removed by sieving and the dispersion thus obtained is ready. The resulting dispersion of surface-treated ZnO is low viscous and shows no sedimentation after several months storage at ambient conditions.

Comparison of the Compatibility of Non-Surface Treated Silica and Inventively Modified Silica and Subsequent Polymerization For purpose of comparison of the compatibilities, an untreated commercial silica is compared with silica surface-treated according to the present invention.

The water-borne silica is Levasil® 100/30 from EKA Chemicals AB, received as an aqueous dispersion, whereas the inventively modified silica was provided in the above-described manner.

The two different silica dispersion were initially dried at 60° C. for 24 hours. Then, the resulting product was ground with a mortar. The dispersions were prepared at 3.2% by weight, using vinyl acetate as polymerizable monomer as the dispersant liquid. Once the components of the mixture were weighted, the flasks were put in an ultrasound bath for 30 minutes. As observed, just after the samples were taken out of the sonification bath, the unmodified silica separated very fast, whereas the modified silica was homogeneously dispersed in the monomer.

As further observed, even after 3 hours in reposed state, it can be observed that the modified silica is still well dispersed whereas the unmodified silica is totally separated as at the beginning of the test. Finally, even after 24 hours in repose, most of the modified silica is still in dispersion, however, showing a clear front at the top of the dispersion and some sediment at the bottom of the flask. However, the silica is still somehow dispersed in the monomer.

This experiment shows that the inventive modification of the silica is necessary in order to disperse the silica in the monomer; otherwise, the silica precipitates and it is not possible to have an homogeneous organic phase and a stable miniemulsion to be polymerized in order to form a seed.

This was confirmed by subsequent emulsion polymerization experiments: The inventively modified silica delivered excellent polymerization results due to the high compatibility with the polymerizable monomer (vinyl acetate) and the resulting polymers, whereas the comparative silica did not lead to reasonable polymerization results, rather leading to an amorphous polymerization mass.

3. Polymerization Step (Method Step (c))

Physical Description of the Process

Emulsion polymerization is an oil-in-water emulsion stabilized by surfactant which is polymerized using a free-radical initiator. In this process the nucleation of polymer particles takes place by entry of radicals into micelles (heterogeneous or micellar nucleation) or by precipitation of growing oligoradicals in the aqueous phase (homogeneous nucleation). Although droplet nucleation is possible (by entry of oligoradicals into the micron size droplets), this is very unlikely because of the large difference in surface area of the monomer swollen micelles (5 to 20 nm) with respect to the monomer droplets (1 to 10 μm) that favors entry of the oligoradicals into micelles and hence micellar nucleation. Once the particles are formed in emulsion polymerization, the polymer particles undergo substantial growth by polymerization. The monomer required for the polymerization must be transported from the monomer droplets by diffusion through the aqueous phase. This represents, in many cases, a limitation of the emulsion polymerization technique because it is very difficult to incorporate very hydrophobic monomers into the polymer particles due to their limited or negligible diffusion through the aqueous phase. The need of mass transport of monomer through the aqueous phase would be greatly reduced if all (or a large fraction) of the droplets were nucleated. The nucleation in monomer droplets can be enhanced if the droplet size is reduced and the surface area of the droplets is large as compared with that of the micelles and hence droplet nucleation prevails over the other nucleation mechanisms.

What it is known as miniemulsion polymerization is basically an oil-in-water emulsion where the size of the monomer droplets has been considerably reduced (50 to 500 nm) by combining a suitable emulsifier and an efficient emulsification technique and stabilizing the resulting nano-emulsion (so-called miniemulsion in the field) against diffusional degradation by using a costabilizer (a low molar mass hydrophobic compound). Under this condition, the surfactant is adsorbed on the large surface area of the monomer droplets and hence (ideally in a well formulated miniemulsion) the available surfactant to form micelles is negligible and micelles are not present in the dispersion. Therefore if a water-soluble initiator is added to the system and oligoradicals are formed in the aqueous phase they preferentially enter into monomer droplets that become polymer particles; namely, the main nucleation mechanism is droplet nucleation. The droplet nucleation is a unique feature of the miniemulsion polymerization.

If all the monomer droplets present in the original dispersion (monomer miniemulsion) capture radicals all the droplets become polymer particles. This has been taken as an inherent feature of the miniemulsion polymerization, but it hardly takes place in practice; namely, in addition to droplet nucleation other nucleation mechanisms such as homogeneous and micellar nucleation might also take place as well as droplet coagulation and degradation.

A miniemulsion formulation usually includes water, monomer(s), a costabilizer and the surfactant and initiator systems. Typically the procedure to prepare the miniemulsion is as follows: The surfactant system is dissolved in water, the costabilizer is dissolved in the monomer(s) mixture and both solutions are brought together and mixed under magnetic agitation. The resulting coarse emulsion is converted into a nano-emulsion by applying energy, generally from mechanical devices (rotor-stator systems, sonifiers and high-pressure homogenizers are the most common ones) or from the chemical potential of the components (low energy emulsification methods like phase inversion temperature).

From the mechanical devices, the high-pressure homogenizers (Manto-Gaulin homogenizer and Microfluidizer) are the most efficient techniques in terms of achieving the smallest droplet sizes. Both equipments have in common that the coarse dispersions are pressurized using a positive displacement pump, and flow through a narrow gap at high velocity. A strong pressure drop also occurs.

As explained above droplet nucleation is a unique feature of the miniemulsion polymerization process and this nucleation mechanism has prompted the discovery of applications that were not possible by other conventional dispersed phase polymerization techniques. Thus, the incorporation of hydrophobic material (polymers and inorganic material) to produce waterborne polymer/polymer and polymer/inorganic nanocomposite dispersions has become possible by miniemulsion polymerization.

On behalf of the present invention, nanocomposite dispersions are produced by this technique, wherein the dispersions comprise composite particles of surface-modified inorganic nanoparticles surrounded by or embedded in organic polymers ("latex").

The main polymer phase in the hybrid system is produced in-situ by polymerization of suitable monomers. Typically, all acrylic and acrylic/styrenic formulations are used to take advantage of the weather and water resistance of the acrylic polymers.

The encapsulation of inorganic nanoparticles by means of miniemulsion polymerization requires: (i) the nanoparticles to be hydrophobic enough as to be dispersed homogeneously in the monomer and costabilizer phase; (ii) formation of monomer nanodroplets with the inorganic material encapsulated; (iii) polymerization of all (or at least a large fraction) of the nanodroplets avoiding other possible nucleation mechanisms.

The success on the encapsulation of the inorganic nanoparticles by miniemulsion polymerization usually depends on the interplay of several parameters. Thus, the compatibility of the modified nanoparticle and the monomers (interfacial tension nanoparticle-monomer) and the interaction of the nanoparticle with the aqueous phase (interfacial tension nanoparticle-aqueous phase) are key parameters to determine the achievable morphologies.

(a) General Polymerization Methods
Emulsion Polymerization for Clear Coatings

1. Mixing the aqueous phase and the organic phase by magnetic stirring. The organic phase contains the monomers (methylmethacrylate (MMA), butyl acrylate (BA) and acrylic acid (AA), the costabilizer (octadecyl acrylate) and solvent-borne nanoceria (nanoparticles, preferably chemically modified with reactive silanes and physically modified with dispersing/wetting agents). The amount of nanoceria corresponds to the total amount in the formulation, while the amount of monomers is 22% of the total amount in the formulation. This mixture was stirred for 15 minutes at 800 rpm magnetically. The aqueous phase is prepared by mixing the emulsifier (Dowfax®, The Dow Chemical Company, United States of America) and water by magnetic stirring.

2. Both the aqueous phase and the organic phase were initially mixed by magnetic stirring for 15 minutes. The miniemulsion was then sonified (Digital Sonifier® Branson, Branson Ultrasonics, United States of America, operating at 8-output control and 80% duty cycle for 5 minutes in an ice bath and under magnetic stirring). This step produces a stable miniemulsion.

3. The miniemulsion was introduced in the reactor and heated up to the reaction temperature before inserting the initiator (potassium persulfate (KPS)) in a shot and proceeding with the polymerization. This way the initial seed is produced. The reaction temperature is set at 75° C. and the batch polymerization is carried out for 30 minutes.

4. The initial seed was used to produce a seeded semibatch emulsion polymerization in which the rest of the monomers was added in a pre-emulsion together with water and part of the emulsifier (Dowfax®, in the case of coating binder) and a shot of initiator (KPS). The monomers fed are MMA/BA/AA and the final solids content is 40% by weight.

5. A post-polymerization is carried out to get rid of the residual monomer. The temperature is risen to 90° C. for 1 hour.

The resulting product obtained from the polymerization is a nanocomposite dispersion comprising the hybrid/composite particles consisting of inorganic nanoparticles, on the one hand, and organic polymers, on the other hand, wherein the hybrid or composite particles are present in a continuous phase or dispersion medium, respectively. Synonymously, this nanocomposite dispersion is also denoted as a latex. As used herein, the term "latex" is synonymous with "dispersion" and/or "emulsion" and refers to the product of a particular emulsion-polymerization reaction. In that regard, the term "latex" is typically understood to mean an aqueous or water-based polymer emulsion, without separation of the polymer product from the aqueous carrier (e.g. water), which may include other liquid as well as certain by-product components within the emulsion.

Emulsion Polymerization for Adhesives

1. The aqueous phase and the organic phase were mixed by magnetic stirring. The organic phase contained the monomer vinyl acetate (VAc) and a modified nanoclay as previously described. The amount of nanoclay corresponds to the total amount in the formulation, while the amount of monomer is 10% of the total amount in the formulation. The mixture was ultrasonified for 5 minutes and magnetically stirred for 16 hours. The aqueous phase was prepared by heating the mixture of polyvinyl alcohols (PVAs) and water at 90° C. for 2 hours. Afterwards the mixture was left to cool down.

2. Both the aqueous phase and the organic phase were initially mixed by magnetic stirring for 15 minutes. The miniemulsion was then sonified (operating at 8-output control and 80% duty cycle for 5 min in an ice bath and under magnetic stirring). Thereby, a stable miniemulsion was produced.
3. The miniemulsion was inserted into the reactor and heated up to the reaction temperature before the initiator potassium persulfate was inserted in a shot and polymerization was proceeded. This way the initial seed was produced. The reaction temperature was set at 65° C. and the batch polymerization was carried out for 60 minutes.
4. The initial seed was used to produce a seeded semibatch emulsion polymerization in which the rest of the monomers was added in a pre-emulsion together with water and part of the emulsifier (Dowfax®, in the case of coating binder) and a shot of initiator potassium persulfate. The reaction temperature was set at 70° C., the monomer vinyl acetate was fed. The final solid content was 50% by weight.
5. A post-polymerization is carried out to get rid of the residual monomer. An additional shot of KPS is added and the reaction is left to react for another hour.
(b) Specific Polymerization Methods Example 21

Examples with Water-Borne Ceria Nanoparticles

The following mixture is used to produce 200 g of latex, comprising a solid content of 30%, containing 2% by weight nanoceria (with respect to the total solids)

| Component | Amount [g] |
|---|---|
| MMA | 29.7 |
| BA | 29.7 |
| AA | 0.6 |
| Nanobyk ®-3810 | 4.8 |
| Dowfax ® (surfactant) | 1.33 |
| Deionized Water | 140 |
| KPS | 0.3 |

MMA: methyl methacrylate
BA: butyl acrylate
AA: acrylic acid
KPS: potassium persulfate
Nanobyk ®-3810 used in water dispersion, inorganic $CeO_2$-UV absorber
Dowfax ®: dodecyldiphenyloxidedisulfonate In this case, the water-borne nanoceria (Nanobyk®-3810, BYK-Chemie GmbH, Germany) was used in the formulation and the polymerization was carried out batchwise by conventional emulsion polymerization. The polymerization was carried out in a 0.5 liter glass jacketed reactor fitted with a reflux condenser, sampling device, $N_2$ inlet and a stirrer rotating at 150 rpm. The temperature and the feedings were controlled by an automatic control system (Camile T G, CRW Automation Solutions, United States of America). All components were charged in the reactor and after reaching the desired temperature (75° C.) and a shot of the initiator potassium persulfate dissolved in water (0.3 g in 10 g of water) was added. The reaction was carried out for 3 hours.

Example 22

Examples with Solvent-Borne Ceria Nanoparticles

In this example the synthesis of a hybrid nanoceria/acrylic binder for coating applications is described starting from solvent-borne ceria nanoparticles. The formulation is used to produce 1,100 g of latex with a solids content of 40% by weight, based on the formulation, and containing 0.5% by weight of nanoceria (with respect to the total solids).

| | Component | Seed [g] | Feed [g] |
|---|---|---|---|
| Oil phase | MMA | 51.98 | 184.1 |
| | BA | 51.98 | 184.1 |
| | AA | 1.05 | 3.72 |
| | Nanobyk ®-3812 | 2.55 | |
| | octadecyl acrylate | 4.33 | |
| Water phase | Dowfax ® | 4.67 | 8.265 |
| | Deionized water | 255 | 418 |
| | KPS | 0.525 | 1.325 |

MMA: methyl methacrylate
BA: butyl acrylate
AA: acrylic acid
KPS: potassium persulfate
Nanobyk ®-3812 was dried (at 60° C. for two days) before using
Dowfax ®: dodecyldiphenyloxide disulfonate (Dowfax ® 2A1 45%, The Dow Chemical Company, United States of America)

As it has been stated in the detailed description, the process consists of two main steps. In the first step the seed is prepared and in the second step further polymerization is proceeded by seeded semibatch emulsion polymerization.
Preparation of the Seed
The oil phase was prepared by dissolving the monomer mixture (MMA:BA:AA weight ratio: 49.5:49.5:1), the costabilizer (octadecyl acrylate) and the nanoceria. This mixture was magnetically stirred for 15 minutes at 800 rpm. The aqueous phase was obtained by dissolving the emulsifier (Dowfax®) in water. Before using a high shear device (Digital Sonifier® Branson, Branson Ultrasonics, United States of America), both phases were magnetically mixed for 15 minutes. The miniemulsion was then sonified (operating at 8-output control and 80% duty cycle for 5 minutes in an ice bath and under magnetic stirring). Once sonified, the miniemulsion was placed in the reactor and the temperature was increased to 75° C. After reaching the desired temperature, a shot of initiator (0.525 g potassium persulfate in 10 g of water) was added into the reactor, and the mixture was batchwise polymerized for 30 minutes.
Feeding
Once the seed containing the hybrid nanoceria/acrylic particles was produced by miniemulsion polymerization, the seeded emulsion polymerization was carried out. A new shot of initiator was added (1.325 g of potassium persulfate in 20 g of water) and the rest of the monomers was fed as a pre-emulsion. This strategy was used to increase the solids content up to 40% by weight. After feeding, the temperature was raised to 90° C. for 1 hours.

Example 23

Examples with Solvent-Borne Clay Nanoparticles

In this example the synthesis of a hybrid clay/polyvinyl acetate binder for adhesive applications is described starting from solvent-borne clay nanoparticles. The formulation was used to produce 410.6 g of latex, comprising a solid content of 50.43% by weight, based on the formulation and containing 0.96% by weight of clay, based on the solid content.

| | Component | Seed [g] | Feed [g] | Cooking [g] |
|---|---|---|---|---|
| Oil phase | VAc | 17.5 | 175.0 | — |
| | modified | 2.0 | — | — |

|  | Component | Seed [g] | Feed [g] | Cooking [g] |
|---|---|---|---|---|
| Water phase | DELLITE® 43B (Example 14) | | | |
|  | NaHCO₃ 2.44% by weight | 14.0 | — | — |
|  | potassium persulfate at 1.6% by weight | 28.55 | 13.8 | 2.25 |
|  | polyvinyl alcohol solution at 7.3% by weight | 157.5 | — | — |

As it has been stated in the detailed description, the process consists of two main steps. In the first step the seed is prepared and in the second step the mixture is further polymerized by seeded semibatch emulsion polymerization.

Preparation of the Seed

The solution of polyvinyl alcohol is prepared by heating the mixture of polyvinyl alcohol and water at 90° C. for 2 hours. Then it is left to cool down. The clay and the monomer (corresponding to the seed) were mixed, ultrasonified for 5 minutes and magnetically stirred overnight. The buffer and initiator solutions were prepared before starting the reaction.

The reaction mixture was prepared by mixing the clay dispersion in monomer, the polyvinyl alcohol and buffer solution. In order to obtain a miniemulsion, the mixture was ultrasonified for 5 minutes at 9 output control and 80% duty cycle (Digital Sonifier® Branson 450) under cooling and magnetically stirring. Then, the mixture was loaded into the reactor and the temperature was set at 65° C. while bubbling nitrogen and stirring with 100 rpm. Once the temperature was stable at the set point, the initiator solution was added as a shot. The seed was ready after 1 hour of reaction.

Feeding and Cooking

Once the seed was obtained, the temperature was set at 70° C. and 150 rpm of stirring. The monomer and initiator solution were fed for 3 hours in two different streams. At the end of the feeding time, the initiator solution corresponding to the cooking was added and left to react for 1 hours. Then the latex was cooled down to room temperature.

Characterization of the Products from Examples 22 and 23:

Size

Acrylic Binder with Cerium Oxide Nanoparticles

The particle diameter of the cerium oxide nanoparticles before the polymerization is around 12 nm, measured by Dynamic Light Scattering (DLS). The final hybrid nanoceria composite particle size is between 170 and 200 nm, as measured by DLS.

Poly(Vinyl Acetate) Binder with Clay

The clay is a layered silicate with high aspect ratio, from 300 to 600 nm in length and thickness of 1 nm. The clay sheets are aggregated forming stacks, with a basal interlaying space of 1.2 nm. The final hybrid nanocomposite latex particle diameter (number average) of all the poly(vinyl acetate), PVAc, binders is between 650 and 900 nm, as measured by Transmission Electron Microscopy (TEM).

Composition

Acrylic Binder with Cerium Oxide Nanoparticles

The polymer of the acrylic binders is formed from a mixture of methyl methacrylate (47.54% by weight), butyl acrylate (47.54% by weight), acrylic acid (0.96% by weight) and stearyl acrylate (3.96% by weight) monomers. Different hybrid binders with cerium oxide contents between 0.4 and 2% by weight with respect to the total solids have been produced. The total solid content of the binders is between 30 and 40% by weight.

Poly(Vinyl Acetate) Binder with Clay

The binder made of poly(vinyl acetate) contains 5.63% by weight of poly(vinyl alcohol) as protective colloid, and the rest is only vinyl acetate. Different hybrid binders with clay contents between 0.3 and 1% by weight, with respect of the total solids have been produced. The total solid content of the binders is 51% by weight.

Particle Morphology

Acrylic Binder with Cerium Oxide Nanoparticles

Two of the main parameters to control in the production of hybrid polymer particles, are the location of the inorganic nanoparticles with respect to the polymer particle (encapsulated inside them or on their surface) and the number of the $CeO_2$ nanoparticles per polymer particle and their aggregation state. Both factors are key aspects when considering the final dispersion of the inorganic material in the polymer film.

TEM image show an acrylic binder produced with 0.5% by weight of $CeO_2$. In these TEM image it can be seen that most of the polymer particles contain $CeO_2$ nanoparticles which are seen as black dots. Most $CeO_2$ nanoparticles are encapsulated within polymer particles even if a small fraction seems to be located on the surface of a polymer particle.

An statistical analysis of approximately 500 polymer particles were performed. The particle diameter distribution was measured directly on the TEM images. The mean of the distribution is rather close to the average size determined by DLS, approximately 200 nm. The evaluation of the TEM images shows the following: Some particles do not contain $CeO_2$ nanoparticles (less than 4% of the polymer particles), but the majority of the polymer particles contain one nanoparticle; a lower number of polymer particles contain 2 nanoparticles (less than 3% of the polymer particles). Finally, to determine if the nanoparticles are aggregated, the nanoparticle size distribution was determined. It can be observed that the largest population corresponds to a nanoparticle size between 13 and 18 nm, which is close to the original size of the nanoparticles, as measured by DLS, which means that most of the cerium oxide nanoparticles were not aggregated during the polymerization process. Nevertheless, a small fraction of the final cerium oxide nanoparticles were aggregates of 3 or 4 original nanoparticles.

Atomic force microscopy, AFM, images of the latex surface were also examined. From the phase image, one can see some small bright dots, which correspond to a rigid material, i.e. the $CeO_2$ nanoparticles. These dots are also observed in the height image. The large lighter areas of observed in the phase image may correspond to exuded surfactant. The AFM images show that the number of nanoparticles present on the polymer particles surface is low, suggesting again a predominant encapsulated morphology.

Poly(Vinyl Acetate) Binder with Clay

TEM images of the PVAc binder produced with 1% by weight of clay were also examined. In this case, the clay (sheets of approximately 500 nm with a thickness of 1 nm) are not seen on the particle surface. It is not easy to observe the interior of the polymer particles due to their large size. However, some sheets of clay can be observed, and they are within the polymer particles.

Film Morphology

Acrylic Binder with Cerium Oxide Nanoparticles

Once the latexes were produced, films were obtained at 23° C. and 50% of relative humidity. Thin cross-sections of the films (about 100 nm) were obtained by microtomy. A series of TEM images (with different magnifications) of the film obtained from the latex with 0.5% by weight of $CeO_2$ nanoparticles were examined: As observed, the boundaries between the polymer particles are lost due to film formation. The black spots in the film are the $CeO_2$ nanoparticles and the grey part is the polymer matrix. The distribution of the $CeO_2$ nanoparticles is rather homogeneous in the film. This homogeneous distribution is kept for larger $CeO_2$ nanoparticles content. An statistical analysis of the TEM images, shows that the nanoparticle size distribution observed in the particles remains in the final film. The addition of $CeO_2$ nanoparticles does not change the glass transition temperature of the binder, which is around 18° C.

Poly(Vinyl Acetate) Binder with Clay

Furthermore, a couple of TEM images of thin cross-sections of films obtained from the PVAc binder with 1% by weight of clay were examined. The film was obtained at 23° C. and 50% of relative humidity and then cut by microtomy. The polymer particles retain their shape due to limited coalescence and/or interdiffusion. The clay appears as darker aggregates in the polymer particles. The polymer particles containing clay, usually aggregated, are around 35% in number. In most of the cases, the clay is well encapsulated within the polymer particles, not only on the surface, as is usually the case in academic reports.

Clay aggregates are encapsulated within polymer particles. Around 35% of the particles have clay. Again, this is the first time that such a clear encapsulation of montmorillonite platelets is obtained in polymer particles, at solids contents as high as 50%.

Conclusions

Regarding the acrylic binder with $CeO_2$ nanoparticles, it is observed that the nanoparticles are encapsulated within the polymer particles and the nanoparticles are not extensively aggregated within the polymer particles. A large number of polymer particles contain $CeO_2$ nanoparticles. The nanoparticles are well distributed in the final polymer film. This is the first time that such a controlled encapsulation of cerium oxide nanoparticles inside polymer particles is obtained, both because of the high degree of encapsulation, in a very high percentage of polymer particles and with a very low degree of aggregation between inorganic nanoparticles. Furthermore, all of that obtained at 40% solids content.

The performing in step (c) in the inventive manner is linked to a multitude of advantages:

The compatibility of the surface-modified inorganic nanoparticles with the polymerizable monomer systems has been optimized in order to have an even dispersion of the inorganic material in the organic phase.

An initial seed has been prepared by miniemulsion polymerization in which the compatible inorganic material has been added in the organic phase. As the amount of the polymer in this miniemulsion does not exceed a certain value of the total monomer in the recipe (e.g. 23%), the temperature can be easily controllable. Furthermore, the amount to be miniemulsified is very small and therefore scalable.

The so produced latex containing the inorganic material has been further polymerized by semibatch emulsion polymerization. In order to obtain final solids contents up to 40% and even more, with encapsulated morphology and with an even and non-aggregated distribution of the polymer particles.

The further film formation of the so produced latexes has not produced aggregation of the inorganic particles either, showing a good encapsulation of the inorganic material and a good compatibility with the polymer. The spatial distribution of the inorganic material in the film has been also highly homogeneous.

4. Application Tests

The inventive nanocomposite dispersions as prepared in the above Examples as well as the resulting nanocomposites comprising the inventive composite particles of inorganic nanoparticles and organic polymers were subjected to various application test, especially for coating and adhesive applications. The test results and the respective test methods are described in detail hereinbelow.

(a) Examples for Clear Coatings

In order to analyze the properties, especially the weather resistance and the UV protection capability, of the binders prepared according to the inventive method, different formulations for the use in clear coatings for wood-based materials have been prepared as delineated hereinafter:

Dry Content of the Binder in Fully Formulated Wood Coatings

The dry binder content in fully formulated wood coating system should be 10 to 90% by weight, preferably 30 to 70% by weight, most preferably 45 to 55% by weight, based on the fully formulated coating systems.

Additional Additives

Possible additives used in water-borne wood lacquer are different thickeners, defoamers, leveling agents, dispersion agents, preservative for in-can stability and film protection, wax, matting agent, clays, UV-absorbers, hindered amine light stabilizers (HALS), amines (adjusting pH), co-solvents (different glycols).

Test Methods

To demonstrate the UV protection capability of the nanoparticle hybrid binders of the invention different fully formulated wood coating systems were prepared. A commercial acrylic binder commonly used in wood coatings was used as reference. As a further reference, a commercial binder together with an UV-absorber was also used.

The wood coating systems were tested according to three different standardized test methods. All test were carried out exactly according to the test methods.

EN 927-3 (Natural Exposure Field Test)

The different wood coating systems were tested: 6 wood panels for each system were included. The panels were first treated with a commercial primer containing a fungicide, commonly used for wood coatings. The coating system were applied by spray in two layers to form a clear coat with a total thickness of 100 µm. After 10 months of exposure, the following conclusions can be drawn: 1) All coating systems of the invention comprising UV absorbing nanoparticles give an excellent UV protection. 2) For the commercial systems with or without UV absorber, UV exposure caused yellowing. The UV light caused yellowing is much larger in the case of the commercial system without UV absorber and even more larger when compared to the inventive systems. 3) No tendency to aging, blistering or cracking can be seen for the inventive systems, especially if compared to the standards.

EN927-6 (QUV)

The different wood coating systems were tested: 4 wood panels for each system were included. The panel preparation and coating was done as above and placed in the QUV test equipment. After 500 hours the following interims conclusions can be drawn: 1) The nanoparticle hybrid binders of the invention give an excellent UV protection after 500 hours, fully comparable with the references with commercial UV absorbers. 2) No tendency to aging, blistering or cracking can be seen.

ISO 11341:2004 (WoM)

The different wood coating systems were tested: 4 wood panels for each system were included. The panel preparation and coating was done as above and placed in the WoM test equipment. After 500 hours the following conclusions can be drawn: 1) The nanoparticle hybrid binders of the invention give an excellent UV protection after 500 hours, fully comparable with the references with commercial UV absorbers. 2) No tendency to aging, blistering or cracking can be seen.

(b) Examples for Adhesives

In order to analyze the properties, especially mechanical properties (e.g. heat resistance and water resistance as well as tensile strength), of the binders/adhesives prepared according to the inventive method, different formulations for the use in adhesives for wood-based materials have been prepared as delineated hereinafter, wherein all tested adhesives are PVAc-based adhesives.

The term "adhesive system" as used herein refers to a combination of components which functions as and is intended to be used together as an adhesive. The components may be present in the same adhesive composition comprising all the components necessary for its function as an adhesive or in separate compositions, such as an adhesive composition and a hardener, functioning as an adhesive when combined. Such separate compositions may be mixed shortly before application to the surfaces to be joined or be applied separately to the surfaces. The adhesive system of the invention is particularly useful for joining pieces of wooden materials.

One of the objectives of the present invention is to provide PVAc-based wood adhesives with good heat resistance. According to the prior art, since PVAc is thermoplastic and when a PVAc glue joint is heated over room temperature it softens slightly, it has been impossible to use cheap standard PVAc so far, for instance, in laminated beams or other carrying constructions because sunshine or elevated temperatures summertime may weaken the construction and decrease the safety. According to the present invention, this drawback has been overcome by the inventive nanocomposite particles comprising a polymeric matrix (i.e. PVAc-based matrix) with surface-modified inorganic nanoparticles homogeneously embedded or distributed herein.

It is well known in the prior art that the heat resistance (or rather the glass transition temperature Tg) is generally higher in thermoplastic nanoparticle polymer composites compared to the polymer itself. The merits of the present invention are to use this knowledge in the field of PVAc-based wood adhesives: Since a relatively small addition of a cheap nanoparticles (such as exfoliated clays or silica) can increase the Tg for standard PVAc enough to pass the test for heat resistance, it has also a large business impact since today one needs to use more expensive adhesives, such as PVAc cured with isocyanates or melamine based adhesives.

The inventive adhesives do also show sufficient water resistance. To be able to use the invention in carrying constructions, the glue joint needs to have a certain minimum water resistance (which is fulfilled by the inventive adhesives).

Solid Content of PVAc in a Fully Formulated PVAc Based Wood Adhesive

The solid content of PVAc in the fully formulated wood adhesive should be between 10 and 70% by weight, preferably between 30 and 55% by weight and most preferably between 40 and 52% by weight, based on the fully formulated wood adhesive.

Typical Additives in PVAc Based Wood Adhesives

The adhesive system may further comprise additives selected among, for instance, preservatives, antifoaming agents, viscosity adjusting agents; fillers such as kaolin, calcium carbonate, wheat meal, soy meal, walnut shell meal; and other additives known to be suitable for use in wood adhesive formulations, including combinations thereof.

Test Methods

To demonstrate the properties, especially the mechanical properties, different fully formulated adhesive systems were prepared. Comparative adhesive systems were tested as a reference. The adhesive systems were tested according to different standardized test methods. All test were carried out exactly according to the test methods.

Heat Resistance/Tensile Share Strength at Elevated Temperatures

The tensile strength of the adhesive compositions was measured according to the standard test WATT 91, the "Wood Adhesives Temperature Test" (SS:EN 14257:2006), using a universal test machine of the type Alwetron TCT50. Each of the adhesive compositions were spread on two boards which were pressed together for about 15 minutes at a temperature of about 75° C. In this test method, two pieces of beach-wood are glued together with a glue joint measuring 10 mm×20 mm. After curing and conditioning for 7 days, the glue joint is pulled apart in an aforementioned Alwetron. On the basis of the results obtained, a mean value for ten pieces was evaluated.

Two different parameters were measured, namely: the tear strength in MPa needed to pull the glue joint apart, on the one hand, and, on the other hand, the area % wood fibers that can be seen in the failure, wherein a good adhesive should have 100% fiber, which means that the glue joint is stronger than the surrounding wood.

All inventive adhesive systems gave a distinct improvement (up to 23% better compared to the reference) of the heat resistance.

Water-Resistance (EN 204/205)

In this test method, two pieces of beach-wood are glued together with a glue joint measuring 10 mm×20 mm. After curing and conditioning for 7 days, the glue joint is treated with water at different temperatures and times before pulling apart in an aforementioned Alwetron. Depending on the results, the adhesive is classified in four different classes D1 to D4:

D1: pure water-resistance

D2: standard water-resistance for most PVAc adhesives (The glue is water-resistant but only for limited periods.)

D3: good water-resistance even if exposed for many hours or even days

D4: Excellent water-resistance (used in applications were the glue joint will be more or less constantly wet during many days)

All inventive adhesive systems gave a distinct improvement of the water-resistance.

The above examples show that, for the first time, veritable nanoparticle/PVAc composites, with the nanoparticles inside the PVAc particles, are provided, increasing the Tg and the heat resistance of PVAc-based adhesives, showing also sufficient water-resistance (i.e. water-resistance is not affected by the addition of nanoparticles). These results may also be reached by relatively low nanoparticle loadings.

The invention claimed is:

1. A method for producing a nanocomposite dispersion comprising composite particles of inorganic nanoparticles and organic polymers in a dispersion medium as a continuous phase, wherein the method comprises the following method steps:
(a) providing inorganic nanoparticles in the form of a dispersion comprising the inorganic nanoparticles;
(b) then, subjecting the dispersion comprising the inorganic nanoparticles resulting from step (a) to a surface modification, wherein the surface modification comprises an at least two-stage surface treatment comprising: (i) one stage where the inorganic nanoparticles are contacted with at least one dispersing agent and (ii) another stage where the inorganic particles are provided with functional groups on their surfaces via chemical reaction;
wherein the dispersing agent used is a polymeric dispersant and is based on a functionalized polymer having a number-average molecular weight of at least 500 g/mol, and wherein the surface treatment stage (i) is performed by adding the at least one dispersing agent to the dispersion of the inorganic nanoparticles, followed by homogenizing the resulting dispersion and contacting the inorganic nanoparticles with the at least one dispersing agent for a time sufficient to allow for an interaction between the surface of the inorganic nanoparticles and the dispersing agent, thus modifying the surface of the inorganic nanoparticles by the dispersing agent, wherein the surface treatment stage (i) is performed with introduction of energy input with an energy amount introduced, calculated as energy introduced per inorganic nanoparticles amount, between 5,000 to 500,000 kJ/kg, and wherein by the surface treatment stage (ii) the inorganic nanoparticles are provided with functional groups which are compatible with or reactive with the polymerizable monomers used in step (c);
(c) subsequently, combining the dispersion comprising the surface-modified inorganic nanoparticles, resulting from step (b) with at least one kind of polymerizable monomers, followed by a polymerization of the polymerizable monomers in the presence of the surface-modified inorganic nanoparticles, via emulsion polymerization, thus resulting in a nanocomposite dispersion comprising composite particles of inorganic nanoparticles and organic polymers in a continuous phase dispersion medium, wherein polymerization is performed by polymerizing the polymerizable monomers in the presence of the surface-modified inorganic nanoparticles and, optionally, in the presence of at least one polymerization initiator, wherein polymerization is performed as an at least two-stage polymerization process comprising a first stage producing a seed of composite particles of inorganic nanoparticles and organic polymers, followed by a second stage where polymerization is continued, finalized by a post polymerization step.

2. The method according to claim 1,
wherein the inorganic nanoparticles are formed of metal or semimetal oxides, metal or semimetal hydroxides, metal or semimetal oxide hydroxides, metal or semimetal oxyhydroxides, metal or semimetal carbides, metal or semimetal nitrides, metal or semimetal sulfides, metal or semimetal tellurides, metal or semimetal selenides, metal or semimetal halides, metal or semimetal carbonates, metal or semimetal phosphates, metal or semimetal sulfates, metal or semimetal silicates, metal or semimetal borates, metal or semimetal vanadates, metal or semimetal tungstates, metal or semimetal aluminates, apatites, zeolites, graphenes, carbon nanotubes and carbon blacks as well as combinations and mixtures of these compounds and mixed compounds and alloys of different metals and/or semimetals.

3. The method according to claim 1,
wherein the inorganic nanoparticles have particle sizes in the range from 0.1 to 2,000 nm; and
wherein the inorganic nanoparticles have a granular, spherical, elongated or plate-like shape.

4. The method according to claim 1,
wherein the dispersion comprising the inorganic nanoparticles in step (a) is provided by at least one of precipitation methods, mechanochemical processing methods, comminution methods, sol-gel methods, hydrothermal or solvothermal methods, physical vapor deposition methods, chemical vapor deposition methods, flame pyrolysis methods, decomposition methods and combustion synthesis.

5. The method according to claim 1,
wherein, in step (b), the surface treatment stage (i) comprising contacting the inorganic nanoparticles with at least one dispersing agent is performed by adding the at least one dispersing agent to the dispersion of the inorganic nanoparticles, followed by homogenizing the resulting dispersion and contacting the inorganic nanoparticles with the at least one dispersing agent for a time sufficient to allow for an interaction between the surface of the inorganic nanoparticles and the dispersing agent, thus modifying the surface of the inorganic nanoparticles by the dispersing agent.

6. The method according to claim 1,
wherein, in step (b), the dispersing agent used is a polymeric dispersant having a number-average molecular weight in the range from 500 to 10,000,000 g/mol; and
wherein, in step (b), the dispersing agent is used in amounts in the range from 5 to 500% by weight, based on the inorganic nanoparticles.

7. The method according to claim 1,
wherein, in step (b), the surface treatment stage (i) comprising contacting the inorganic nanoparticles with at least one dispersing agent is performed for a duration from 0.001 to 24 hours and in a temperature range from 0 to 150° C.

8. The method according to claim 1,
wherein, in step (b), by the surface treatment stage (ii) the inorganic nanoparticles are provided with functional groups which are compatible with or reactive with the polymerizable monomers used in step (c).

9. The method according to claim 1,
wherein, in step (b), by the surface treatment stage (ii) the inorganic nanoparticles are provided with functional groups selected from isocyanate groups, urethane groups, carbamate groups, epoxy groups, carboxylic acid groups, carboxylic acid anhydride groups, carboxylate groups, hydroxy groups, thiol groups, amine groups, organic groups comprising carbon-carbon double bonds, vinyl groups, ethylenically unsaturated groups, acrylate groups, methacrylate groups, alkyl groups, alkenyl groups, alkinyl groups, aryl groups, aralkyl groups, cycloalkyl groups, cycloalkylene groups, halogens, alkoxy groups, acyloxy groups and combinations thereof.

10. The method according to claim 1,
wherein, in step (b), the surface treatment stage (ii) comprising providing the inorganic nanoparticles with functional groups on their surfaces is performed by contacting or reacting the inorganic nanoparticles with at least one surface-modification agent comprising functional groups, wherein the surface-modification agent comprising functional groups is selected from organofunctional silanes comprising at least one functional group selected from isocyanate groups, urethane groups, carbamate groups, epoxy groups, carboxylic acid groups, carboxylic acid anhydride groups, carboxylate groups, hydroxy groups, thiol groups, amine groups, organic groups comprising carbon-carbon double bonds, vinyl groups, ethylenically unsaturated groups, acrylate groups, methacrylate groups, alkyl groups, alkenyl groups, alkinyl groups, aryl groups, aralkyl groups, cycloalkyl groups, cycloalkylene groups, halogens, alkoxy groups, acyloxy groups; carboxylic acids; carboxylic acid anhydrides; carboxylates; and combinations thereof.

11. The method according to claim 1,
wherein, in step (b), the surface treatment stage (ii) comprising providing the inorganic nanoparticles with functional groups on their surfaces is performed by contacting or reacting the inorganic nanoparticles with at least one surface-modification agent comprising functional groups, wherein the surface-modification agent comprising functional groups is used in amounts in the range from 0.0001 to 100% by weight, based on the inorganic nanoparticles.

12. The method according to claim 1,
wherein the surface modification according to step (b) comprises (iii) a further stage of surface treatment where the inorganic nanoparticles are contacted with at least one non-polymeric or non-reactive surface-modifier, wherein the non-polymeric or non-reactive surface-modifier is selected from emulsifiers or surfactants.

13. The method according to claim 1,
wherein, in step (c), polymerization is performed in a temperature range from 5 to 200° C. and for a duration in the range from 0.01 to 48 hours; and
wherein, in step (c), polymerization is performed by polymerizing the polymerizable monomers in the presence of the surface-modified inorganic nanoparticles and in the presence of at least one polymerization initiator,
wherein polymerization is performed as an at least two-stage polymerization process comprising a first stage producing a seed of composite particles of inorganic nanoparticles and organic polymers, followed by a second stage where polymerization is continued, optionally finalized by a post-polymerization step.

14. The method according to claim 1,
wherein, in step (c), polymerization is performed by polymerizing the polymerizable monomers in the presence of the surface-modified inorganic particles, using the polymerizable monomers and the surface-modified inorganic particles in an organic monomers/inorganic surface-modified nanoparticles weight ratio from 99.9:0.1 to 20:80.

15. The method according to claim 1,
wherein the polymerizable monomer is an ethylenically unsaturated monomer selected from the group consisting of (i) alkyl(meth)acrylates of linear, branched or cycloaliphatic alcohols comprising 1 to 22 carbon atoms; (ii) aryl(meth)acrylates; (iii) (meth)acrylic acids, citraconic acid, crotonic acid, cinnamic acid, maleic acid and salts, anhydrides and esters thereof; (iv) hydroxyalkyl(meth)acrylates of linear, branched or cycloaliphatic diols comprising 2 to 36 carbon atoms; (v) mono(meth)acrylates of ethers, polyethylene glycols, polypropylene glycols or mixed polyethylene/propylene glycols each comprising 5 to 80 carbon atoms; (vi) caprolactone- and/or valerolactone-modified hydroxyalkyl(meth)acrylate; (vii) aminoalkyl(meth)acrylates; (viii) (meth)acrylates of halogenated alcohols; (ix) oxiranyl (meth)acrylate; (x) styrenes and substituted styrenes; (xii) ethylenically unsaturated heterocycles; (xiii) phosphoric acid containing ethylenically unsaturated monomers; (xiv) ethylenically unsaturated sulfonic acids and sulfates and salts thereof; (xv) vinylesters of carboxylic acids comprising 1 to 20 carbon atoms; (xvi) vinylesters of versatic acids; (xvii) maleimides; (xviii) (meth)acrylamide; (xix)N-alkyl- and N,N-dialkyl-substituted (meth)acrylamides comprising linear, branched or cycloaliphatic alkyl groups comprising 1 to 22 carbon atoms; (xx) silyl containing (meth)acrylates; (xxi) allyl alcohol and polyethers thereof comprising 5 to 80 carbon atoms; (xxii) alkenes; and
mixtures or combinations thereof.

16. The method according to claim 1,
wherein the nanocomposite dispersion resulting from step (c) comprises the composite particles of inorganic particles and organic polymers in a weight-based concentration from 0.1 to 90% by weight, based on the nanocomposite dispersion; and
wherein the composite particles in the nanocomposite dispersion resulting from step (c) comprise inorganic nanoparticles and organic polymers in a organic polymers/inorganic nanoparticles weight ratio from 99.9:0.1 to 20:80.

17. The method according to claim 1,
wherein the composite particles in the nanocomposite dispersion resulting from step (c) have particle sizes in the range from 1 to 2,500 nm.

18. A method for producing a nanocomposite dispersion comprising composite particles of inorganic nanoparticles and organic polymers in a continuous phase,
wherein the method comprises the following method steps:
(a) providing inorganic nanoparticles in the form of a dispersion comprising the inorganic nanoparticles;
(b) then, subjecting the dispersion comprising the inorganic nanoparticles resulting from step (a) to a surface modification, wherein the surface modification comprises an at least two-stage surface treatment comprising: (i) one stage where the inorganic nanoparticles are contacted with at least one dispersing agent and (ii) another stage where the inorganic particles are provided with functional groups on their surfaces;
(c) subsequently, combining the dispersion comprising the surface-modified inorganic nanoparticle, resulting from step (b) with at least one kind of polymerizable monomers, followed by a polymerization of the polymerizable monomers in the presence of the surface-modified inorganic nanoparticles, thus resulting in a nanocomposite dispersion comprising composite particles of inorganic nanoparticles and organic polymers in a continuous phase dispersion medium; wherein the dispersion comprising the inorganic nanoparticles in step (a) is provided by at least one of precipitation methods, mechanochemical processing methods, comminution methods, sol-gel methods, hydrothermal or solvothermal methods, physical vapor deposition methods, chemical vapor deposition methods, flame pyrolysis methods, decomposition methods and combustion synthesis.

19. A method for producing a nanocomposite dispersion comprising composite particles of inorganic nanoparticles and organic polymers in a continuous phase,
wherein the method comprises the following method steps:
(a) providing inorganic nanoparticles in the form of a dispersion comprising the inorganic nanoparticles;
(b) then, subjecting the dispersion comprising the inorganic nanoparticles resulting from step (a) to a surface modification, wherein the surface modification comprises an at least two-stage surface treatment comprising: (i) one stage where the inorganic nanoparticles are contacted with at least one dispersing agent and (ii) another stage where the inorganic particles are provided with functional groups on their surfaces;
(c) subsequently, combining the dispersion comprising the surface-modified inorganic nanoparticle, resulting from step (b) with at least one kind of polymerizable monomers, followed by a polymerization of the polymerizable monomers in the presence of the surface-modified inorganic nanoparticles, thus resulting in a nanocomposite dispersion comprising composite particles of inorganic nanoparticles and organic polymers in a continuous phase dispersion medium, wherein, in step (b), the dispersing agent used is a polymeric dispersant having a number-average molecular weight in the range from 500 to 10,000,000 g/mol; and wherein, in step (b), the dispersing agent is used in amounts in the range from 5 to 500% by weight, based on the inorganic nanoparticles.

20. A method for producing a nanocomposite dispersion comprising composite particles of inorganic nanoparticles and organic polymers in a continuous phase,
wherein the method comprises the following method steps:
(a) providing inorganic nanoparticles in the form of a dispersion comprising the inorganic nanoparticles;
(b) then, subjecting the dispersion comprising the inorganic nanoparticles resulting from step (a) to a surface modification, wherein the surface modification comprises an at least two-stage surface treatment comprising: (i) one stage where the inorganic nanoparticles are contacted with at least one dispersing agent and (ii) another stage where the inorganic particles are provided with functional groups on their surfaces;
(c) subsequently, combining the dispersion comprising the surface-modified inorganic nanoparticle, resulting from step (b) with at least one kind of polymerizable monomers, followed by a polymerization of the polymerizable monomers in the presence of the surface-modified inorganic nanoparticles, thus resulting in a nanocomposite dispersion comprising composite particles of inorganic nanoparticles and organic polymers in a continuous phase dispersion medium; wherein, in step (c), polymerization is performed in a temperature range from 5 to 200° C. and for a duration in the range from 0.01 to 48 hours; and wherein, in step (c), polymerization is performed by polymerizing the polymerizable monomers in the presence of the surface-modified inorganic nanoparticles and in the presence of at least one polymerization initiator, wherein polymerization is performed as an at least two-stage polymerization process comprising a first stage producing a seed of composite particles of inorganic nanoparticles and organic polymers, followed by a second stage where polymerization is continued, optionally finalized by a post-polymerization step.

* * * * *

UNITED STATES PATENT AND TRADEMARK OFFICE
CERTIFICATE OF CORRECTION

PATENT NO. : 9,650,536 B2  
APPLICATION NO. : 14/413166  
DATED : May 16, 2017  
INVENTOR(S) : Nils Erik Ronne et al.

Page 1 of 1

It is certified that error appears in the above-identified patent and that said Letters Patent is hereby corrected as shown below:

On the Title Page

Item (73), Line 5, please delete "Paris" and insert --País--.

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*